United States Patent
Kwon

(10) Patent No.: US 10,728,371 B2
(45) Date of Patent: Jul. 28, 2020

(54) MOBILE TERMINAL

(71) Applicant: LG ELECTRONICS INC., Seoul (KR)

(72) Inventor: Wooyong Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/567,904

(22) Filed: Sep. 11, 2019

(65) Prior Publication Data

US 2020/0007669 A1 Jan. 2, 2020

Related U.S. Application Data

(63) Continuation of application No. PCT/KR2017/002771, filed on Mar. 14, 2017.

(51) Int. Cl.
*H04M 1/02* (2006.01)
*G06F 1/16* (2006.01)
*G09G 3/3208* (2016.01)

(52) U.S. Cl.
CPC ........ *H04M 1/0266* (2013.01); *G06F 1/1637* (2013.01); *G09G 3/3208* (2013.01); *H04M 1/0264* (2013.01)

(58) Field of Classification Search
CPC .......... G02F 1/133308; H04M 1/0266; H04M 1/0264; G06F 1/1637; G09G 3/3208
See application file for complete search history.

(56) References Cited

U.S. PATENT DOCUMENTS

| | | | |
|---|---|---|---|
| 8,395,722 B2 | 3/2013 | Mathew et al. | |
| 8,947,627 B2 | 2/2015 | Rappoport et al. | |
| 9,143,668 B2 | 9/2015 | Mathew et al. | |
| D786,214 S | 5/2017 | Kwon et al. | |
| 9,640,681 B2 | 5/2017 | Min | |
| 9,736,383 B2* | 8/2017 | Evans, V | H04N 5/2254 |
| 9,894,781 B2 | 2/2018 | Franklin et al. | |
| 10,216,975 B1* | 2/2019 | He | G06K 9/2018 |
| 10,389,927 B2* | 8/2019 | Zhang | H04N 5/2253 |
| 10,425,515 B2* | 9/2019 | Fan | H04M 1/0264 |
| 2004/0212555 A1 | 10/2004 | Falco | |
| 2007/0013802 A1 | 1/2007 | Yang Chen et al. | |
| 2011/0080348 A1 | 4/2011 | Lin et al. | |
| 2013/0182062 A1* | 7/2013 | Son | H04N 7/144 348/14.07 |

(Continued)

FOREIGN PATENT DOCUMENTS

| | | | | |
|---|---|---|---|---|
| EP | 3258408 A1 * | 12/2017 | .......... | G06K 9/0002 |
| JP | 3-26189 A | 2/1991 | | |

(Continued)

*Primary Examiner* — Devan A Sandiford
(74) *Attorney, Agent, or Firm* — Birch, Stewart, Kolasch & Birch, LLP

(57) ABSTRACT

A mobile terminal comprises a window and a display module, which is provided on the rear surface of the window and forms an output area of a display, in order to maximize the output area of the display, wherein the output area of the display module includes: a first output area; a second output area provided at one end on the left side of the first output area; and a third second output area provided at one end on the right side of the first output area, wherein the second output area and the third output area are spaced apart.

15 Claims, 25 Drawing Sheets

(56) References Cited

U.S. PATENT DOCUMENTS

| | | | |
|---|---|---|---|
| 2014/0063049 A1 | 3/2014 | Armstrong-Muntner | |
| 2017/0068287 A1* | 3/2017 | Jung et al. | |
| 2017/0097528 A1* | 4/2017 | Kim | G02F 1/13394 |
| 2017/0124372 A1* | 5/2017 | Evans, V | G06F 1/1684 |
| 2017/0187934 A1* | 6/2017 | Kwak | H04N 5/2251 |
| 2017/0235398 A1* | 8/2017 | Choi | G06F 3/0416 |
| | | | 345/173 |
| 2017/0257566 A1 | 9/2017 | Evans, V et al. | |
| 2017/0270342 A1* | 9/2017 | He | G06F 3/0412 |
| 2017/0300736 A1* | 10/2017 | Song | G06K 9/00033 |
| 2018/0017996 A1 | 1/2018 | Ryu et al. | |
| 2018/0183015 A1 | 6/2018 | Yun et al. | |
| 2018/0204040 A1* | 7/2018 | Kwon | G06F 1/1684 |
| 2018/0262602 A1* | 9/2018 | Zhang | H04M 1/0264 |
| 2019/0243417 A1* | 8/2019 | Cheng | G06F 1/1605 |
| 2019/0243427 A1* | 8/2019 | Nakamura | H04N 5/2253 |
| 2019/0246018 A1* | 8/2019 | Rho | H04N 5/2254 |
| 2019/0251325 A1* | 8/2019 | Park | H05K 1/118 |
| 2019/0253539 A1* | 8/2019 | Ma | H04M 1/0262 |
| 2019/0302527 A1* | 10/2019 | Cheng | G02F 1/133602 |
| 2019/0302833 A1* | 10/2019 | Cheng | G06F 1/1601 |
| 2019/0306295 A1* | 10/2019 | Cheng | H04M 1/0266 |
| 2019/0306296 A1* | 10/2019 | Cheng | H04M 1/0266 |
| 2019/0317629 A1* | 10/2019 | Jung | G06F 1/1684 |
| 2019/0335026 A1* | 10/2019 | Cheng | H04M 1/0264 |
| 2019/0335027 A1* | 10/2019 | Cheng | H04N 5/2252 |
| 2019/0335028 A1* | 10/2019 | Cheng | H04N 5/2254 |

FOREIGN PATENT DOCUMENTS

| | | |
|---|---|---|
| JP | 2009-69334 A | 4/2009 |
| JP | 2010-276898 A | 12/2010 |
| KR | 10-2015-0008998 A | 1/2015 |

\* cited by examiner

MOBILE TERMINAL

CROSS REFERENCE TO RELATED APPLICATIONS

This application is a Continuation of PCT International Application No. PCT/KR2017/002771, filed on Mar. 14, 2017, all of which is hereby expressly incorporated by reference into the present application.

TECHNICAL FIELD

The present disclosure relates to a mobile terminal having a display module configured based on an output region of a display and having a structural feature relative to adjacent components thereto.

DESCRIPTION OF RELATED ART

Reduction of a bezel region in a mobile terminal allows for miniaturization of the mobile terminal and maximization of a display region.

The bezel region of the mobile terminal has a non-functional region that does not function externally and a functional region inevitably provided to perform functions such as input or output.

In particular, electronic components such as a camera, a receiver, a luminance sensor, and a proximity sensor disposed at a top portion of a front face of the mobile terminal prevent the output region of the display from extending upwardly.

Nevertheless, it is not easy to locate these electronic components into a region other than the top portion due to functional requirements.

Under this constraint, consideration regarding arrangement of the functional region and the display output region is needed to realize miniaturization of the mobile terminal and maximization of the display region.

DISCLOSURE

Technical Purposes

The present disclosure aims to solve the problem of the narrow output region in the conventional mobile terminal as described above.

Technical Solutions

One aspect of the present disclosure provides a mobile terminal including: a window; and a display module disposed on a rear face of the window and having an output region, wherein the output region of the display module includes: a first output sub-region; a second output sub-region disposed in a left side in a region above or below the first output sub-region; and a third output sub-region disposed in a right side in the region above or below the first output sub-region, wherein the second output sub-region and the third output sub-region are spaced from each other.

In one implementation, the mobile terminal further includes at least one electronic component disposed between the second output sub-region and the third output sub-region, wherein the least one electronic component includes at least one of a receiver, a camera, a luminance sensor, or a proximity sensor.

In one implementation, the receiver is disposed at a left-right directional center of the window, while the camera is disposed at a left or right side to the receiver, wherein when the camera is located at the left side to the receiver, a left-right directional length of the second output sub-region is smaller than a left-right directional length of the third output sub-region, wherein then the camera is located at the right side to the receiver, the left-right directional length of the second output sub-region is larger than the left-right directional length of the third output sub-region.

In one implementation, the mobile terminal further includes a front casing to cover a rear face of the window and a rear face of the display module, wherein the front casing includes: a mold contacting the rear face of the window and having a non-output region; a metal frame including a first region covering the rear face of the display module and a second region at least partially covering a rear face of the mold; and a seat formed in the second region of the metal frame to seat the at least one electronic component thereon.

In one implementation, the mobile terminal further includes a rib protruding forwardly of the second region of the metal frame and being coupled to the mold.

In one implementation, the rib defines a side wall of the seat.

In one implementation, an adhesive tape is present between the rib and the mold to fix the rib to the mold.

In one implementation, the mobile terminal further includes: a cable extending from the electronic component and defining a terminal; and a cable hole formed in the side wall, wherein the cable passes through the hole.

In one implementation, the mobile terminal further includes: a plurality of first hole-defined protrusions arranged along an outer edge of the metal frame; and a plurality of second hole-defined protrusions arranged at positions corresponding to the plurality of first hole-defined protrusions, wherein each of the plurality of second hole-defined protrusions protrudes from the mold in a thickness direction thereof, wherein a plurality of screws pass through the plurality of first hole-defined protrusions and the plurality of second hole-defined protrusions respectively.

In one implementation, at least one of the plurality of first hole-defined protrusions is formed at one edge adjacent to the electronic component.

In one implementation, a distance from a top edge of the window to the second output sub-region and a distance from a top edge of the window to the third output sub-region are equal to each other, wherein a left-right directional length of the second output sub-region and a left-right directional length of the third output sub-region are equal to each other.

In one implementation, the window has a curved top region curved toward a rear face of the mobile terminal, wherein at least one of the second output sub-region or the third output sub-region is partially located in the curved top region of the window.

In one implementation, the display module includes an organic light emitting diode (OLED).

In one implementation, the mobile terminal further includes a driver to drive output of the display module, wherein the driver is connected to a left, right or bottom side of the display module.

Technical Effects

Effects of the mobile terminal in accordance with the present disclosure are as follows.

According to at least one of embodiments according to the present disclosure, there is an advantage that the display output region can be maximized.

Further, according to at least one of embodiments according to the present disclosure, a balanced output region may be realized while maximizing the display output region.

Further, according to at least one of embodiments according to the present disclosure, there is an advantage that increase in a thickness of the mobile terminal may be maximized.

Furthermore, according to at least one of embodiments according to the present disclosure, there is an advantage that fixing reliability of electronic components may increase.

DETAILED DESCRIPTIONS

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
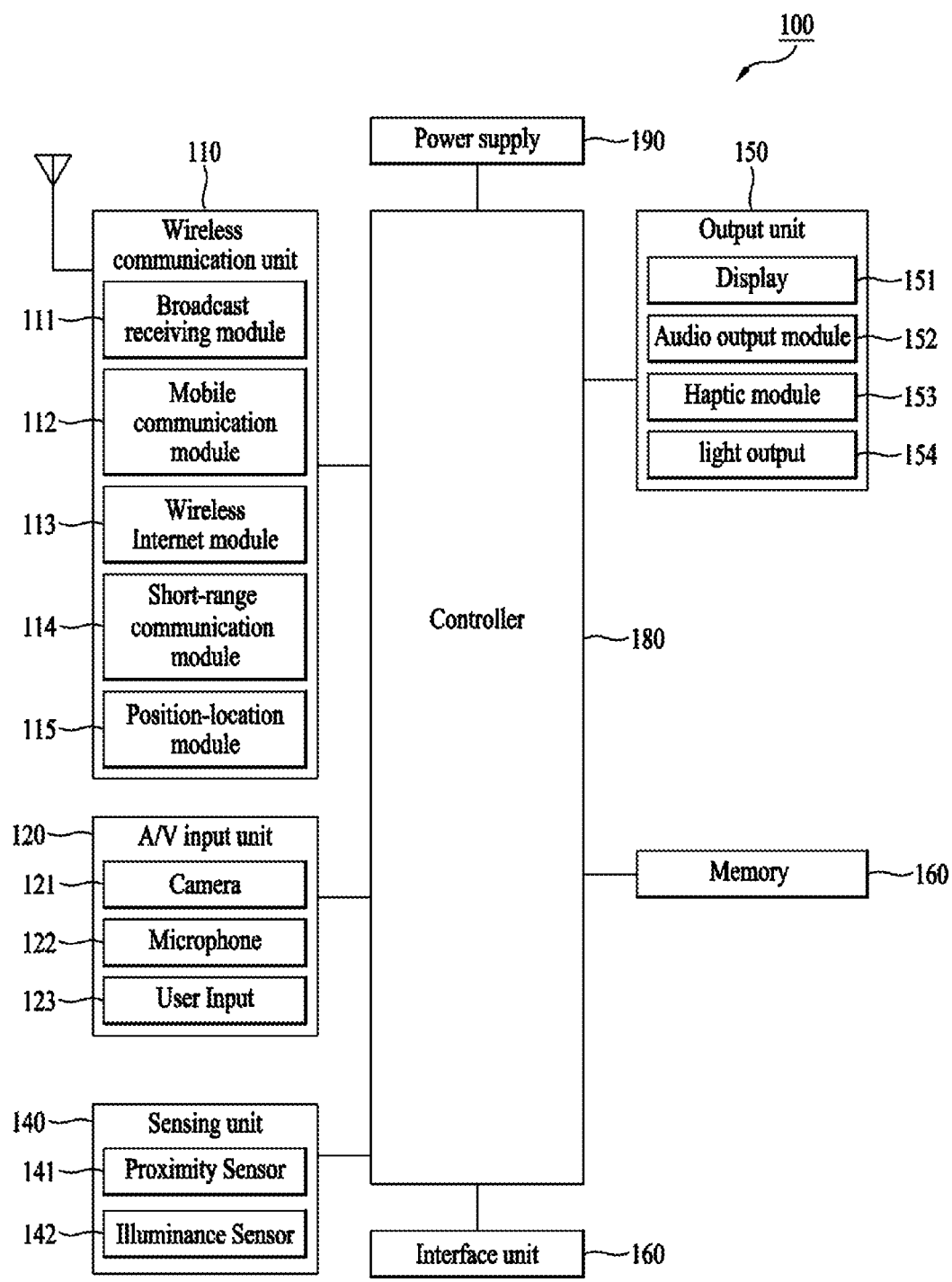
FIG. 1a is a block diagram for describing a mobile terminal according to the present disclosure.
Figure 1B:
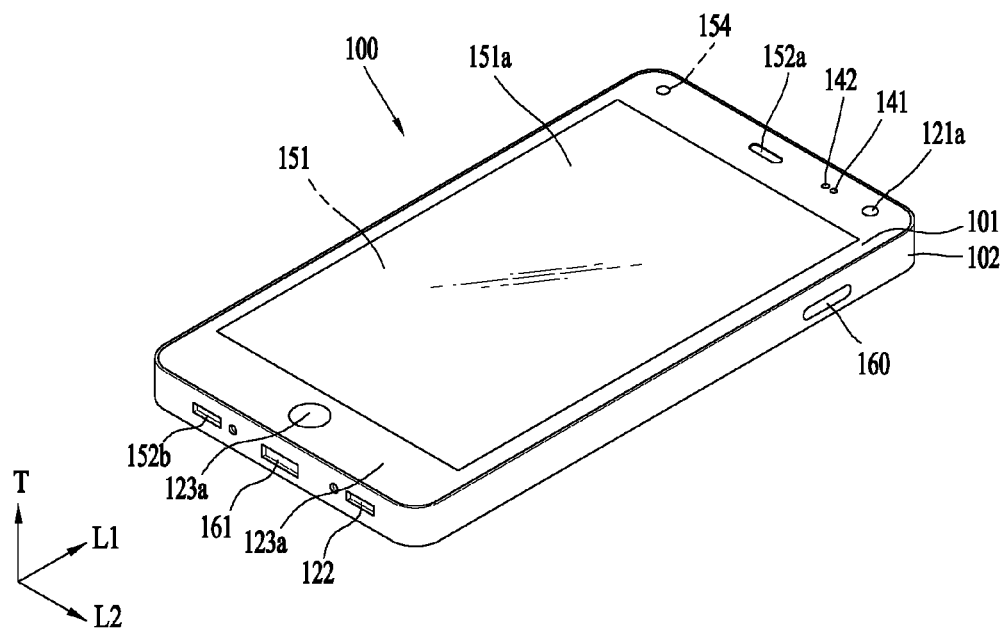
FIG. 1b and FIG. 1c are conceptual views of an examples of a mobile terminal according to the present disclosure as viewed in different directions respectively.
Figure 1C:
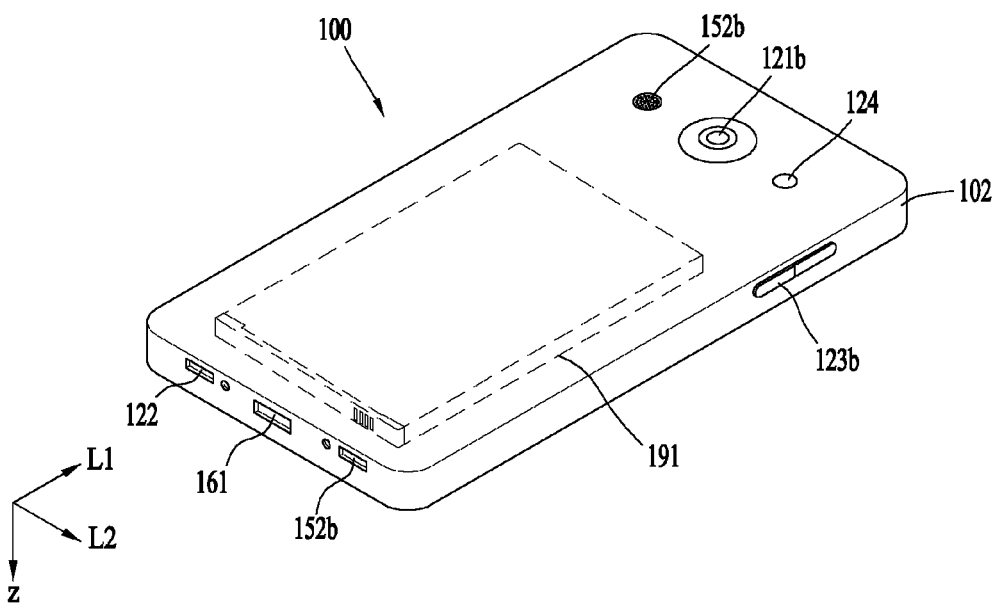

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combined operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

It will be described for the mobile terminal as shown in FIGS. 1B and 1C. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The display module 150a to be described below is a part of the display 151 and refers to a collection of physical components that directly perform a function of the display 151. For example, in the display 151 based on a LCD scheme, the display module 150a may include a display panel, a backlight unit, a driver, and a connection terminal. In the display 151 based on an OLED scheme, the display module 150a may include a display panel, a driver, and a connection terminal.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

The first manipulation unit 123a may perform both of a fingerprint recognition function as one of security authentication functions and a control function of an operation. In this case, a fingerprint recognition sensor may be provided on the first manipulation unit 123a.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

A flash 124 is shown located adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A), may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160.

The input/output port 161 may be docked with another terminal or device in addition to a power supply to perform data transmission/reception.

In some cases, an external receiver may be combined thereto to perform audio or video input/output.

A typical example of the input/output port 161 may include USB (Universal Serial Bus), micro USB, Thunderbolt, or Lightning Cable Port. However, the present disclosure is not limited thereto. Any standard port which may be combined with the cable and performs the above-mentioned function may be available.

The battery 191 may be configured to enable wireless charging using a wireless charger, in addition to enabling wired charging through the input/output port 161 described above. The wireless charging may be implemented in a magnetic induction scheme or a resonance scheme (magnetic resonance scheme).

An appearance of the mobile terminal 100 may be defined by a combination of a window 151*a*, a front casing 101 and a rear casing 102.

The front casing 101 and the rear casing 102 may define a space for receiving the electronic components while defining the appearance of the mobile terminal 100. Main electronic components of the mobile terminal 100 may be mounted on a main printed circuit board (PCB). In this connection, the front casing 101 refers to a frame disposed on a front face of the PCB, while the rear casing 102 refers to a frame disposed on a rear face of the PCB.

However, the above definition is made for convenience of the description and is not necessarily limited thereto. In some cases, the front casing 101 and rear casing 102 may not be clearly distinguished from each other when the front casing 101 or rear casing 102 does not have a sufficient region or a spatial relationship therebetween may be ambiguous.

The front casing 101 or the rear casing 102 may be made of a non-conductive material such as plastic. The non-conductive material may be generally light in weight, which may result in a lighter device and minimize possibility of unintended interference in a RF based operation performed by an antenna or the like.

In contrast, the front casing 101 or the rear casing 102 may be made of a metallic material. A terminal body made of the metal material may have a luxurious appearance and may increase rigidity of the terminal body.

In some cases, the front casing 101 may not be exposed to an outside while not defining the appearance of the mobile terminal 100.

As shown, the rear casing 102 may has an extended region to form a side face of the mobile terminal 100. That is, the window 151*a* and the front casing 101 may be seated on and fixed to the rear casing 102.

Alternatively, although not shown, the front casing 101 may be further extended to form a side face of the mobile terminal 100.

When a side circumference of the terminal body includes a metal material, the side circumference of the terminal body may serve as an radiator of an antenna. Specifically, the side circumference of the terminal body may be shorted to the printed circuit board or another grounding component inside the terminal body to perform an antenna function.

When the side circumferential region of the terminal body functions as an antenna, there is an advantage that a freedom of selection of a material of the front or rear face of the terminal is relatively high.

In order to implement proper antenna performance, the side circumference of the terminal body may have an alternate arrangement between a metal region and a non-metal region. The number of alternations and a length of each region may vary depending on a type of antenna and a bandwidth.

It may not be the case where only the side region of the terminal body performs or helps the antenna function. When a metal material is formed in a band shape in a front edge region or a rear edge region of the terminal body, the band shape may function as an antenna.

The rear casing 102 may define a rear appearance of the mobile terminal 100. In some cases, a rear cover may be coupled to a rear face of the rear casing 102. In particular, when a removable battery 191 is provided on the rear face of the rear casing 102, the rear cover may serve as a battery cover.

Figure 2:
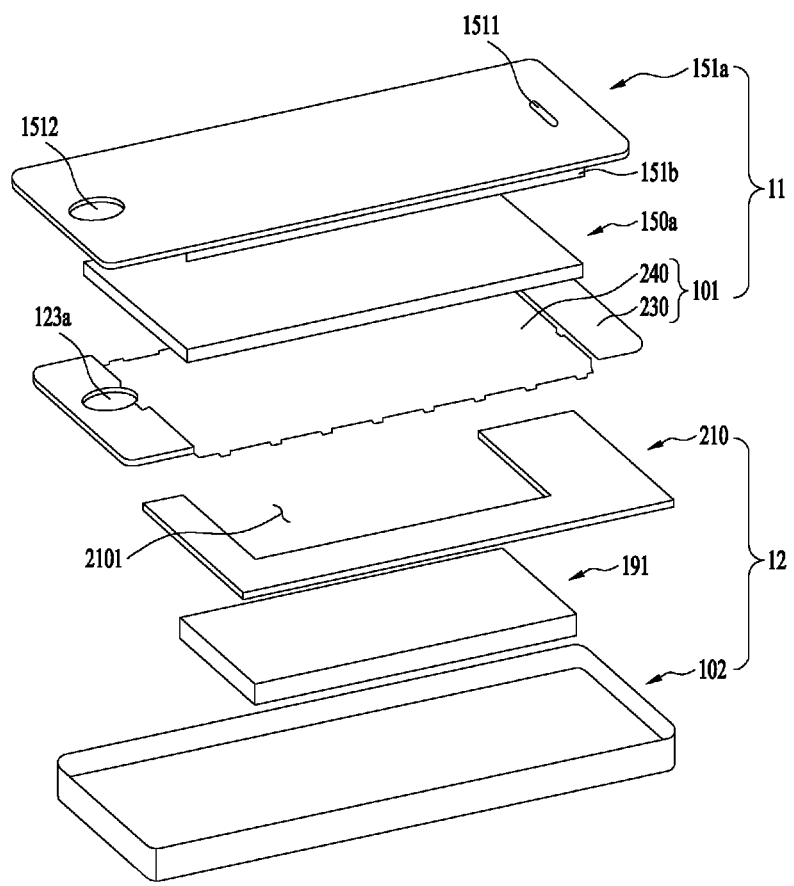
FIG. 2 is an exploded perspective view of a mobile terminal according to the present disclosure.

FIG. 2 is an exploded perspective view of a mobile terminal 100 according to the present disclosure.

On a printed circuit board 210, various electronic components of the mobile terminal 100 may be mounted. The printed circuit board 210 acts as a hub through which the various electronic components may transmit or receive electrical signals to or from each other.

Among the front casing 101 and the rear casing 102 forming the terminal body, the front casing 101 may be provided on the front face of the printed circuit board 210, while the rear casing 102 may be provided on the rear face of the printed circuit board 210.

The front casing 101 may be located on a rear face of the window 151*a* forming at least one region of a front face of the mobile terminal 100 to form a portion of a frame of the mobile terminal 100. The front casing 101 may include a mold 230 made of a non-conductive material and a metal frame 240 made of a conductive material.

The mold 240 may be fixedly coupled to the window 151*a*. For example, the mold 240 and window 151*a* may be fixed to each other via an adhesive material or may be integrally formed with each other using an double injection method.

The non-conductive mold 240 may form a region that does not interfere with the radio frequency based performance of the antenna as described above.

The metal frame 240 supports a rea face of the display module 150a. The metal frame 240 may have rigidity to protect the rear face of the display module 150a and, at the same time, to perform a function of dissipating heat generated from the display module 150a.

The metal frame 240 may be fixed to the display module 150a or mold 240.

A shape of each of the display module 150a, mold 230 or metal frame 240 may vary based on implementations.

For example, the front casing 101 region may have only the metal frame 240 and free of the mold 230.

The window 151a may be made of an optically transparent material and define a front-face of the mobile terminal 100 so that an output region of the display module 150a is viewable from an outside. At the same time, window 151a may have a proper rigidity to protect components located on a rear face thereof such as the display module 150a.

The window 151a may have a sound communication hole 1511 defined therein as described above. The window 151a may further include a buttonhole 1512 for exposing the first manipulation unit 123a to the outside. The buttonhole 1512 may be omitted as necessary.

The window 151a may have an entire front-face region in a flat shape. Alternatively, a partial region of the front face thereof may have a curved shape. In particular, the curved partial region may be an edge region of the window 151a. When the edge region of window 151a has the curved shape toward a rear face of the mobile terminal, user gripping feeling may be improved. Further, a sharp edge region may be changed to a smooth edge region, such that stress concentration due to impact may be prevented.

A combination of the window 151a, display module 150a and front casing 101 may form an upper assembly 11.

The printed circuit board 210 may have a rectangular shape covering a substantial area of a rear face of the metal frame 101 so that the battery 191 may be positioned at the rear face of the PCB. Alternatively, when an electronic component mounted area of the printed circuit board 210 is minimized, the PCB may have an open region 2101 so that the battery 191 may be located in the same layer as the electronic components.

The printed circuit board 210 and the battery 191 may be mounted on the rear casing 102 to form a lower assembly 12.

The upper assembly 11 and the lower assembly 12 may be finally coupled to each other to form a single assembly of the mobile terminal 100.

Figure 3:
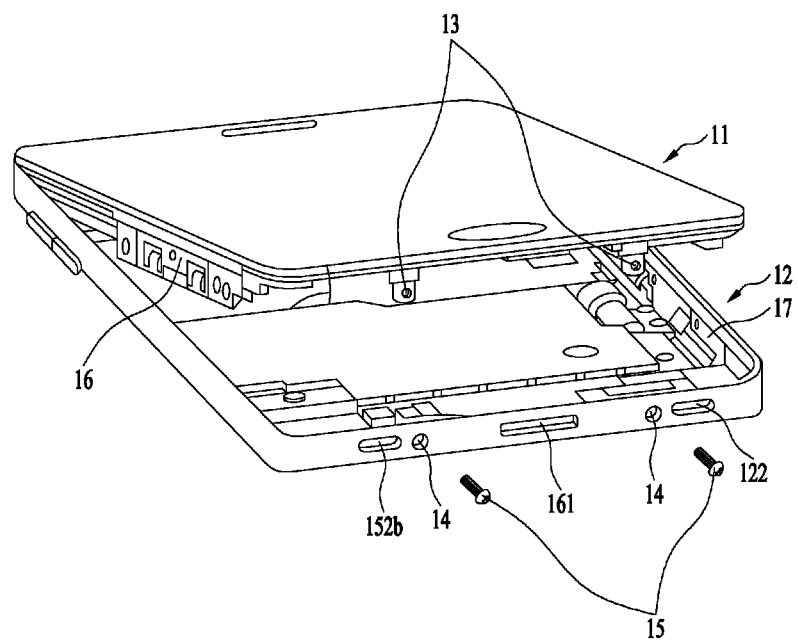
FIG. 3 is a perspective view before combining upper and lower assemblies of a mobile terminal according to the present disclosure.

FIG. 3 is a perspective view before the upper assembly 11 and the lower assembly 12 of the mobile terminal 100 are coupled to each other according to the present disclosure.

The upper assembly 11 may be inserted and seated into and on the lower assembly 12.

An upper hole 13 may be formed in the upper assembly 11, while a lower hole 14 may be formed in the lower assembly 12. In particular, the upper hole 13 may be formed in the mold 240 of the upper assembly 11.

When the upper assembly 11 is seated on the lower assembly 12, the upper hole 13 and lower hole 14 may be aligned with each other and then a screw 15 may pass through the both holes.

The coupling structure of the upper and lower assemblies in which the screw 15 passes through the upper hole 13 and the lower hole 14 may be implemented at one side portion of the mobile terminal 100 or at each of at least two side portions thereof.

At least one side portion free of the upper hole 13 and the lower hole 14 may have a support 16 or 17 to allow the upper assembly 11 and the lower assembly 12 to be coupled to each other. An upper support 16 of the upper assembly 11 may be engaged with a lower support 17 of the lower assembly 12 to increase the assembling force. For example, the supports 16 and 17 may be hooked with each other.

Figure 4:
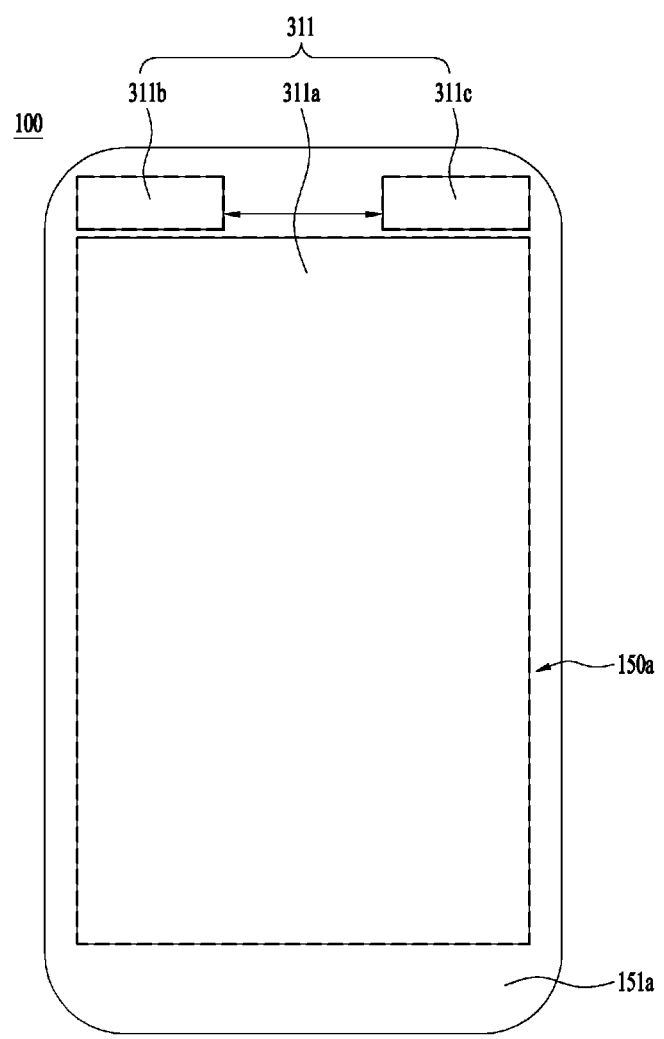
FIG. 4 is a schematic diagram of a front region of a mobile terminal according to the present disclosure.
Figure 5:
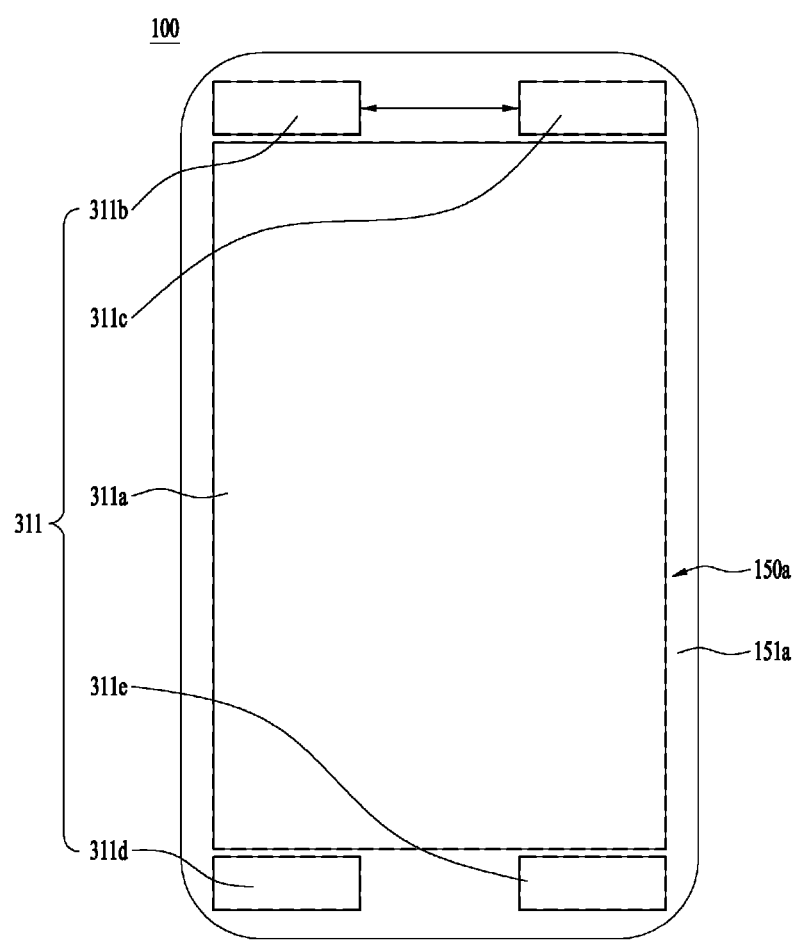
FIG. 5 is a schematic diagram of a front region of a mobile terminal according to the present disclosure.

FIG. 4 and FIG. 5 are schematic diagrams of a front region of the mobile terminal 100 according to the present disclosure.

It may be assumed that a boundary between the window 151a and an front outside space may be a front visible boundary of the mobile terminal 100.

That is, the window 151a described later may define a front-face of the mobile terminal 100.

As described above, the display module 150a is provided on a rear face of the window 151a. In some cases, the display module 150a and the rear face of the window 151a may be spaced a certain distance apart from each other.

The display module 150a has an output region 311 defined by the display panel. In the front-face of the mobile terminal 100, the output region 311 of the display module 150a may be contained in the region defined by the window 151a.

The output region 311 refers to a physical range within which an image may be output from the display module 150a. That is, a boundary of the output region 311 and a boundary of the display module 150a may not coincide with each other.

To maximize the output region 311, the output region 311 according to the present disclosure may be divided into at least three sub-regions. The division of the output region 311 may not mean a physically partitioning.

Therefore, the entire output region 311 may be driven by a single driver. Alternatively, each sub-region may be driven independently by a separate driver.

The output region 311 may include a first output sub-region 311a, second output sub-region 311b and a third output sub-region 311c.

The first output sub-region 311a is the widest rectangular region defined in a front central region of the mobile terminal 100. The first output sub-region 311a may correspond to an output region 311 of the conventional mobile terminal 100.

The second output sub-region 311b may be located in a left side in a region above the first output sub-region 311a. The third output sub-region 311c may be located in a right side in a region above the first output sub-region 311a. In this connection, the second output sub-region 311b and the third output sub-region 311c may be spaced from each other at a predetermined distance.

However, the configuration that the second output sub-region 311b and the third output sub-region 311c are located above the first output sub-region 311a is merely one example. The present disclosure is not limited thereto. That is, the second output sub-region 311b and the third output sub-region 311c may be disposed in a left or right region to the first output sub-region 311a or in a region below the first output sub-region 311a such that the second output sub-region 311b and the third output sub-region 311c may be spaced from each other at a predetermined distance.

For example, as shown in FIG. 5, a fourth output sub-region 311d and a fifth output sub-region 311e may be provided in a region below the first output sub-region 311a such that the fourth output sub-region 311d and the fifth output sub-region 311e are spaced from each other.

Each of the second to fifth output sub-regions 311d to 311e may have a rectangular shape like the first output sub-region 311a.

However, each output sub-region 311 may have roughly the rectangle shape described above. The shape of each output sub-region 311 may not be physically strictly rectangular.

For example, each of portions of the first to fifth output sub-regions corresponding to four corners of the mobile terminal 100 may have a curved shape such that each of the first to fifth output sub-regions has a conformity to the mobile terminal 100 in terms of a shape.

A left-right directional length of the second output sub-region 311b and a left-right directional length of the third output sub-region 311c may be equal to each other. Thus, the second output sub-region 311b and third output sub-region 311c may achieve balanced output.

Figure 6:
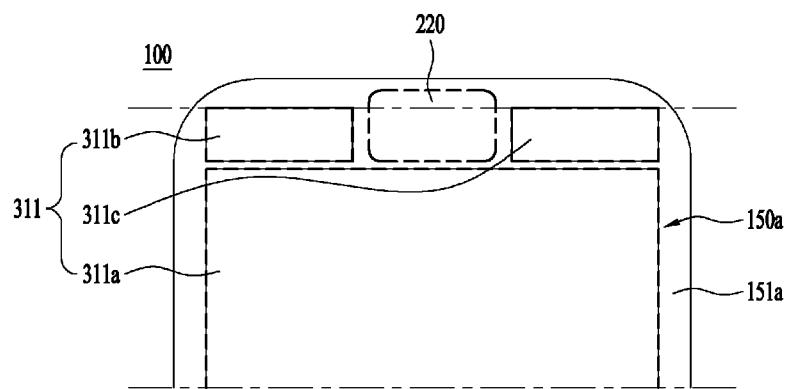
FIG. 6 shows a schematic view of a portion of a front region of a mobile terminal according to the present disclosure.

FIG. 6 shows a schematic view of a portion of a front region of the mobile terminal 100 according to the present disclosure.

The electronic component 220 may be disposed in a space formed between the first output sub-region 311a and the second output sub-region 311b. Therefore, the separation distance between the first output sub-region 311a and the second output sub-region 311b may be determined in consideration of the space occupied by the electronic component 220.

The space between the first output sub-region 311a and the second output sub-region 311b may be defined in the left and right direction but may not be limited in an up and down direction. Accordingly, a spaced occupied by the electronic component 220 may extend beyond a top of each of the first output sub-region 311a and the second output sub-region 311b.

As described above, the electronic component 220 may include at least one of the receiver 221, the camera 222, the luminance sensor 224, and the proximity sensor 223. That is, all of the electronic components 220 may be disposed between the first output sub-region 311a and the second output sub-region 311b. Alternatively, only some of the electronic components 220 may be disposed therebetween due to a space constraint.

Figure 7:
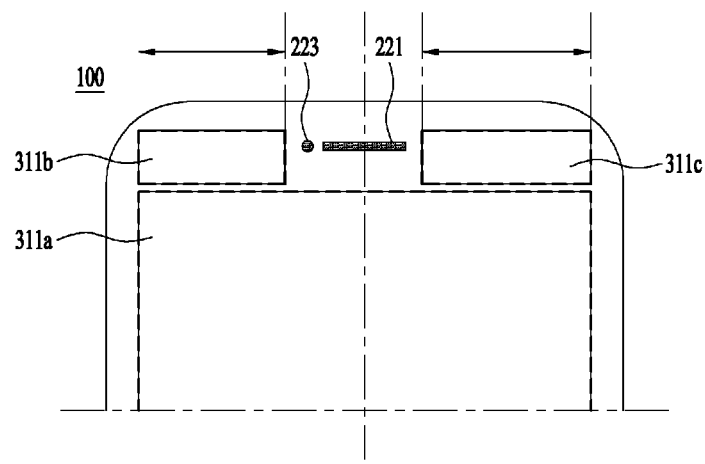
FIG. 7 shows a schematic view of a portion of a front region of a mobile terminal according to the present disclosure.

FIG. 7 shows a schematic view of a portion of a front region of the mobile terminal 100 according to the present disclosure.

For example, only the receiver 221 and the proximity sensor 223 may be disposed between the first output sub-region 311a and the second output sub-region 311b. This is because the receiver 221 and the proximity sensor 223 should be located close to the user's ear when the receiver 221 performs a call function of the mobile terminal 100.

In particular, the receiver 221 may be disposed at a left-right directional center of the mobile terminal 100 to minimize an uncertainty in locating a sound output position when the receiver performs the call function and achieve a spatial balance.

In a similar sense, the proximity sensor 223 is also preferably located at the left-right directional center of the mobile terminal 100. However, for achieving a shape conformity and securing an internal space of the receiver 221, the proximity sensor 223 may not be disposed in a region above or below the receiver 221. Thus, the proximity sensor 223 may be disposed at the left or right side to the receiver 221.

Figure 8:
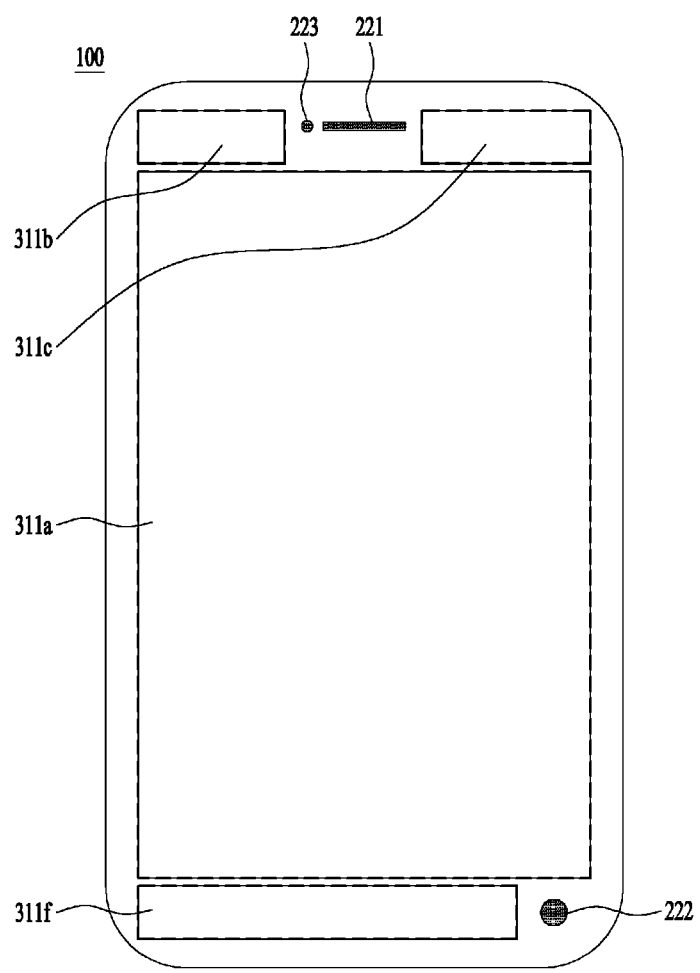
FIG. 8 shows a schematic view of a front region of a mobile terminal in accordance with the present disclosure.

FIG. 8 shows a schematic view of a front region of the mobile terminal 100 according to the present disclosure.

In the embodiment of FIG. 7, a position of the camera 222 should be considered. The camera 222 may be located at a bottom of the mobile terminal 100. The camera 222 may be located at the bottom of the mobile terminal 100 because a position of the camera is relatively less constrained, which is not the case for the receiver 221 or proximity sensor 223.

However, when the mobile terminal 100 is held by a hand, the bottom of the mobile terminal 100 may be covered with the hand. Therefore, the mobile terminal 100 may be used in an upside down state. When the mobile terminal 100 is used in the upside down state, the camera 222 should be positioned at an upper left portion of the mobile terminal 100. Thus, the camera 222 may be positioned at a lower right portion of the mobile terminal 100 when the mobile terminal 100 is maintained in a non-upside down state. The output region 311 may further include a sixth output sub-region 311f which is asymmetrical in the left-right direction, to allow the configuration that the camera 222 may be positioned at a lower right portion of the mobile terminal 100 when the mobile terminal 100 is maintained in a non-upside down state.

Figure 9:
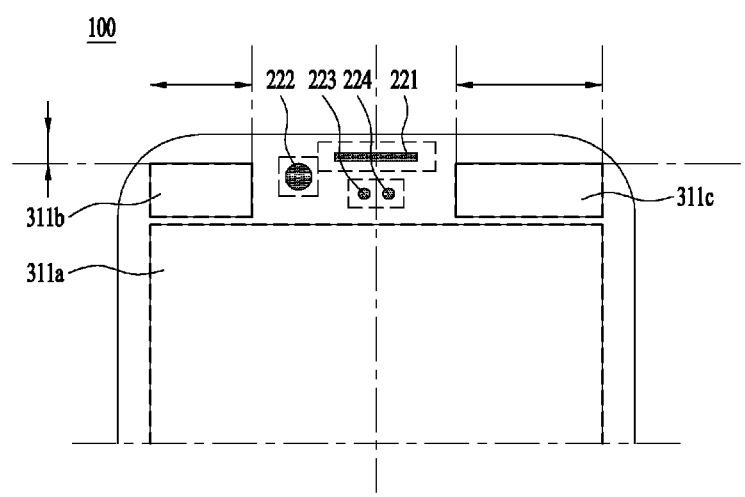
FIG. 9 shows a schematic view of a portion of a front region of a mobile terminal according to the present disclosure.

FIG. 9 shows a schematic view of a portion of a front region of the mobile terminal 100 according to the present disclosure.

As shown in the embodiment of FIG. 9, all of the receiver 221, luminance sensor 224, the proximity sensor 223 and the camera 222 as the electronic components 220 may be disposed between the second output sub-region 311b and the third output sub-region 311c. To maximize the output region 311 via securing the left-right directional length of each of the second output sub-region 311b and the third output sub-region 311c, the receiver 221, the luminance sensor 224, the proximity sensor 223 and the camera 222 are preferably arranged as close as possible to each other.

A spacing between adjacent electronic components 220 may be determined in consideration of a size of each component disposed inside the mobile terminal 100.

In a specific example, the receiver 221 may be disposed at the left-right directional center of the mobile terminal 100, while the proximity sensor 223 and the luminance sensor 224 may be disposed below the receiver 221, while the camera 222 may be disposed at the left or right side to the receiver 221.

The left-right directional length of each of the second output sub-region 311b and the third output sub-region 311c may be determined in consideration of the location of the camera 222.

That is, when the camera 222 is located at the left side to the receiver 221, the left-right directional length of the second output sub-region 311b may be smaller than the left-right directional length of the third output sub-region 311c. When the camera 222 is located at the right side to the receiver 221, the left-right directional length of the second output sub-region 311b may be larger than the left-right directional length of the third output sub-region 311c. This may meet a condition to maximize the left-right directional length of each of the second output sub-region 311b and the third output sub-region 311c when the receiver 221 is disposed at the left-right directional center of the mobile terminal 100, while the camera 222 is disposed at the left or right side to the receiver 221.

Therefore, the left-right directional lengths of the second output sub-region 311b and the third output sub-region 311c may be not equal to each other in order to meet the above condition.

However, vertical dimensions of the second output sub-region 311b and the third output sub-region 311c may be equal to each other. That is, a distance from a top edge of the window 151a to the second output sub-region 311b and a distance from a top edge of the window 151a to the third output sub-region 311c may be equal to each other.

This is to ensure that each of the first to third output sub-regions 311a to 311c has an overall rectangular shape except for a recess region, thereby to achieve a spatial balance.

Figure 10:
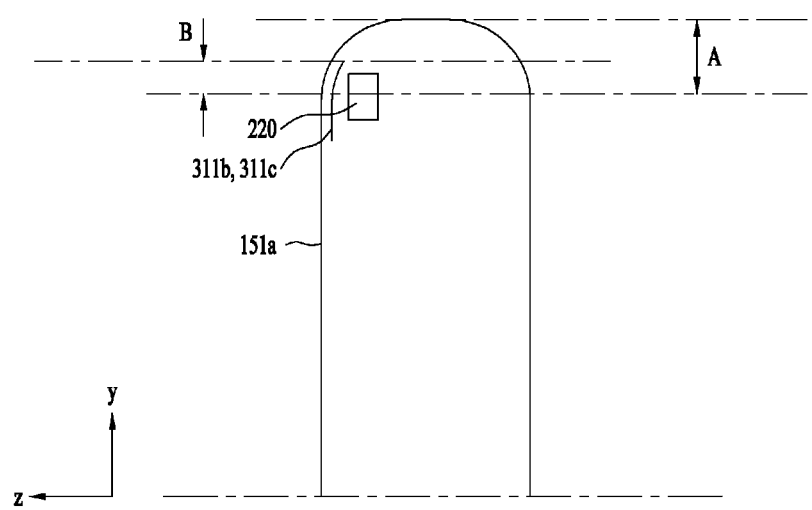
FIG. 10 is a schematic view of a longitudinal cross-section of a mobile terminal in accordance with the present disclosure.

FIG. 10 is a schematic view of a cross-section of the mobile terminal 100 according to the present disclosure along a length thereof.

When an outer boundary of the mobile terminal 100, especially, a top edge of the window 151a has a curved shape curved toward the rear face of the mobile terminal, at least a portion of the second output sub-region 311b or the third output sub-region 311c may be disposed in the top edge.

When the top edge of the window 151a has a shape curved in the rear direction by a width A, the second output sub-region 311b or the third output sub-region 311c is configured using a flat panel display while being free of the curved region. In this case, it may be difficult to maximize the output region 311. Therefore, a top edge B of the second output sub-region 311b or the third output sub-region 311c may have a curved shape.

However, the electronic components 220 may extend in a vertical or horizontal direction while not being inclined with respect to the front-face or rear face of the mobile terminal 100, thereby to facilitate the arrangement of the electronic components.

In order to achieve the curved shape, the display module 150a including the second output sub-region 311b or the third output sub-region 311c may be embodied based on an organic light emitting diode (OLED) scheme. The display module 150a based on the organic light emitting diode scheme is suitable for having a curved shape because the OLED may be easily bent or deformed.

Figure 11:
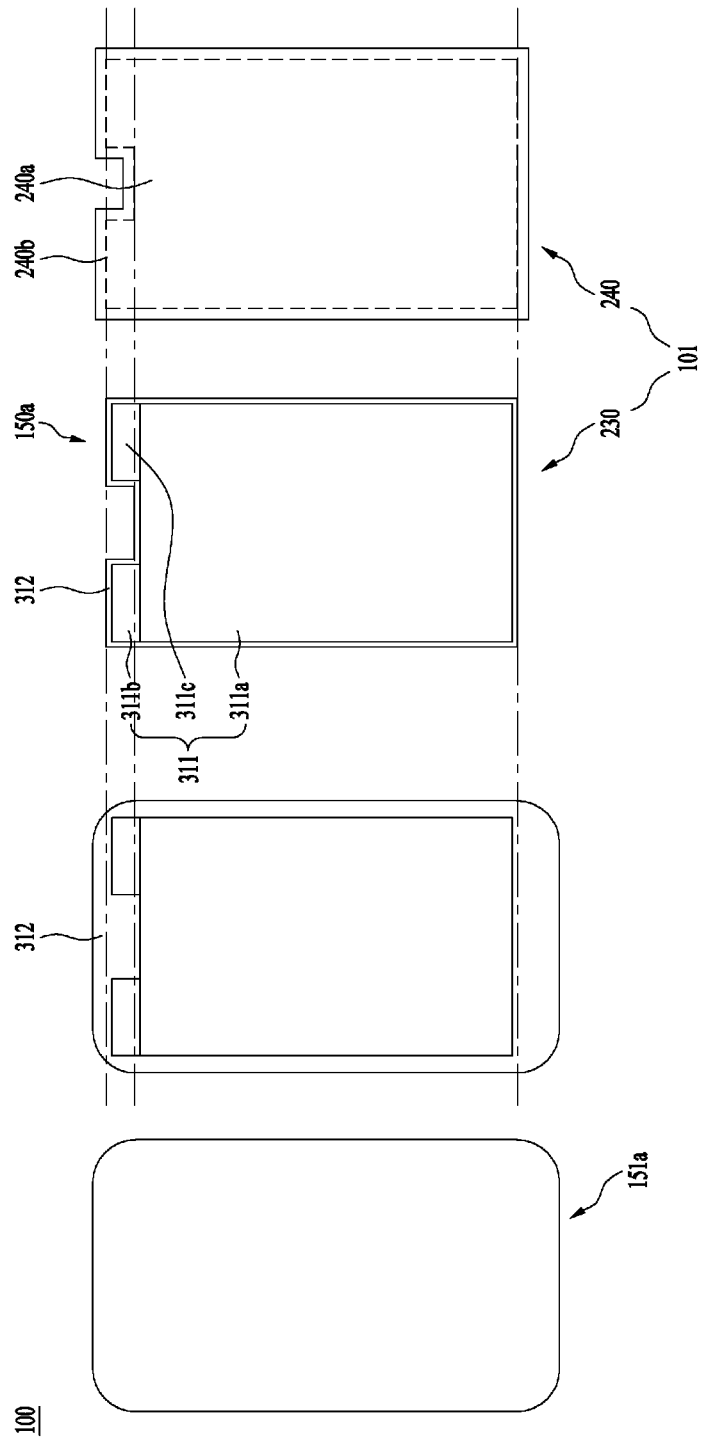
FIG. 11 shows a rear face view of an exploded mobile terminal according to the present disclosure.
Figure 12:
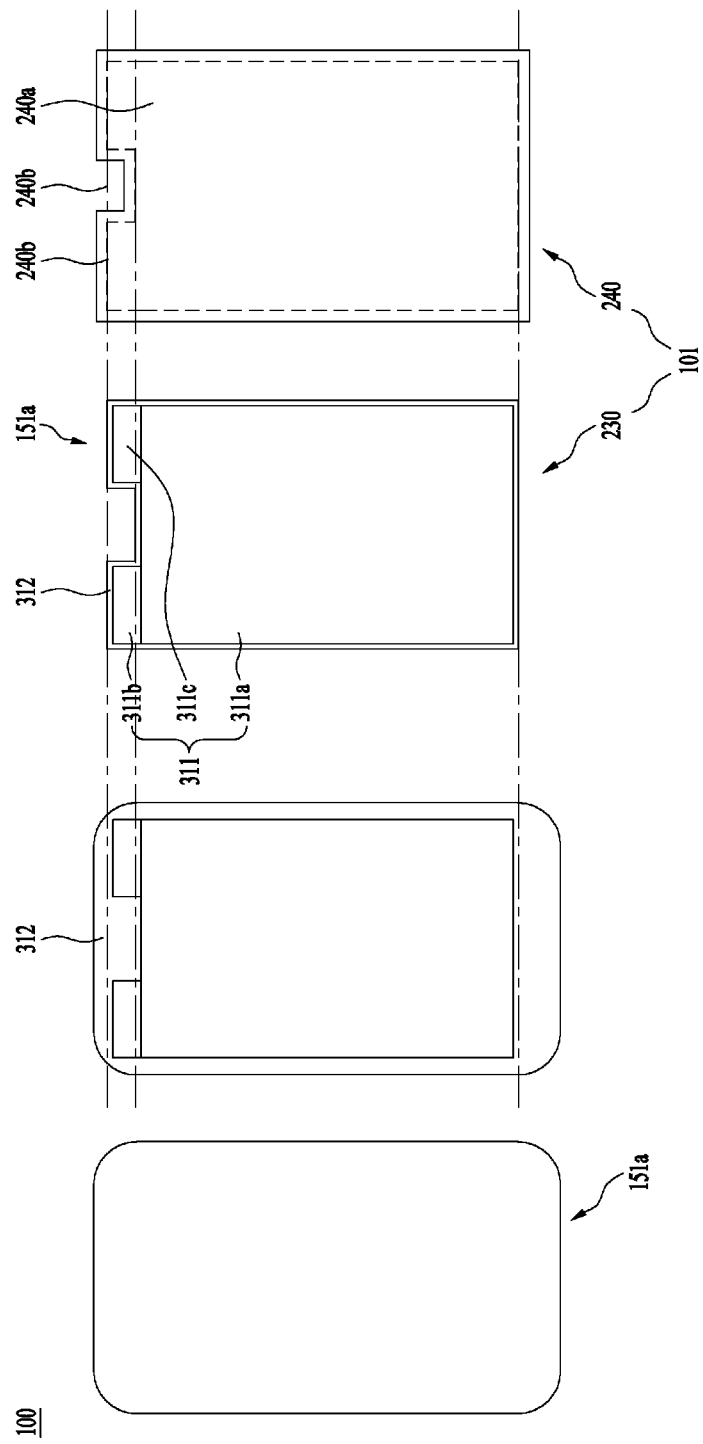
FIG. 12 shows a rear face view of an exploded mobile terminal according to the present disclosure.

FIG. 11 and FIG. 12 show a rear view of a disassembled mobile terminal 100 according to the present disclosure.

As shown in FIG. 11, the front casing 101 covers the window 151a and a rear face of the display module 150a. The front casing 101 may include a mold 230 and a metal frame 240.

The mold 230 may cover a region of the window 151a non-overlapping the display module 150a. The metal frame 240 may cover the display module 150a.

The front casing 101 may be a rigid member and serve as a framework of the mobile terminal 100. The window 151a or the display module 150a may be fixed to the front casing.

The mold 230 may be disposed between the window 151a and the display module 150a. The metal frame 240 may support the display module 150a while being disposed on the rear face of the display module 150a.

The mold 230 may define a rigid region and may further have a non-output region 312 made of an optically opaque material, thereby to prevent other components inside the window 151a from being visually recognized from the outside.

An edge of the output region 311 of the display module 150a may not coincide with an physical edge of the display module 150a.

The non-output region 312 in the mold 230 and the output region 311 in the display module 150a may be complementary with each other.

The metal frame 240 may be composed of a first region 240a covering at least one region of a rear face of the display module 150a and a second region 240b covering at least one region of a rear face of the mold 230.

The first region 240a of the metal frame 240 may define a rigid region contacting the rear face of the display module 150a and may dissipate heat generated from the display module 150a. In some cases, a portion of the first region 240a of the metal frame 240 may be coupled to the display module 150a.

The second region 240b of the metal frame 240 may be coupled to the mold 230. A seat 241 may be formed on the second region 240b to seat at least one electronic component thereon.

The first region 240a and the second region 240b of the metal frame 240 may be integrally formed with each other. For example, the metal frame 240 may be formed in a single mold injected form to integrate the first region 240a and the second region 240b with each other.

When the first region 240a and the second region 240b of the metal frame 240 are integrally formed with each other, there is no need for a separate structure for achieving the fastening or joining between the first region 240a and the second region 240b. This has a synergistic effect between reducing of the material cost, minimizing of a volume, and securing of the rigidity.

Referring to FIG. 12, the second region 240b of the metal frame 240 may have a protruding region or recessed region 240c to sufficiently cover the electronic component 220.

That is, the metal frame 240 may have a rectangular shape across the first region 240a and the second region 240b thereof. However, in some cases, the metal frame 240 may have a partially protruding or recessed portion. This portion may vary depending on the electronic component 220.

The metal frame 240 may not only fix and support the display module 150a but also fix and support the electronic component 220.

Figure 13:
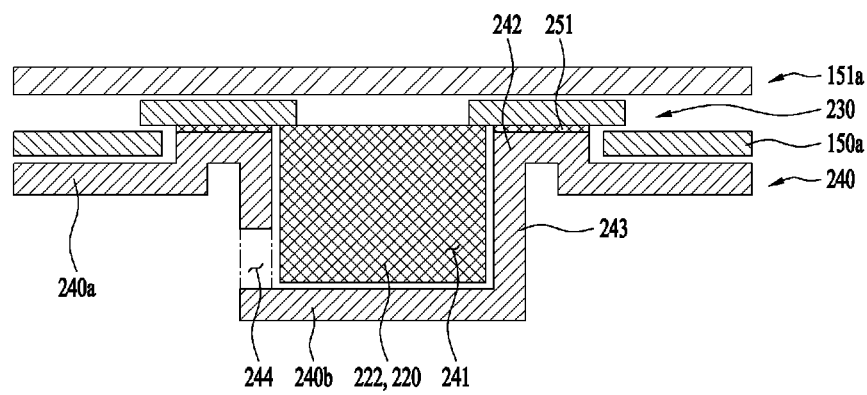
FIG. 13 shows a partial cross-section of a mobile terminal according to the present disclosure.

FIG. 13 shows a partial cross-section of a mobile terminal 100 according to the present disclosure.

The second region 240b of the metal frame 240 may have a seat 241 that supports at least one electronic component 220 thereon. The seat 241 may have a shape corresponding to a shape of a rear face of the at least one electronic component 220 to allow the electronic component 220 to be stably seated thereon.

Since a protrusion dimension from the rear face of the display module 150a and a protrusion dimension from the rear face of the electronic component 220 are different from each other, the metal frame 240 may have a step between the first region 240a and the second region 240b such that protrusion dimensions therefrom are different from each other.

A side wall 243 of the seat 241 corresponds to a side face of the electronic component 220 and serves to stop the electronic component 220 so as not to move laterally.

A rib 242 may define the side wall 243 of the seat 241 and contact a rear face of the mold 230. The rib 242 in contact with the rear face of the mold 230 may be fixed to the rear face via an adhesive tape 251.

In the side wall 243 of the seat 241, a cable hole 244 is defined. Thus, a cable extending from the electronic component 220 and defining a terminal may pass through the hole 244 and escape from the rear face of the metal frame 240. It is appropriate that the cable hole 244 may be formed within the step formed between the first region 240a and the second region 240b.

When the cable hole 244 is formed in the side wall 243 and thus the cable passes through the hole 244 and escapes from the metal frame 240 laterally, a free space of the first region 240a of the metal frame 240 may be used to minimize increase in a thickness of the mobile terminal 100.

The first region 240a and the second region 240b of the metal frame 240 may be continuous while a disconnection region is absent therebetween.

Minimizing the disconnection region between the second region 240*b* and the first region 240*a* may maximize the rigidity of the metal frame 240. This may be advantageous for the second region 240*b* to support at least one electronic component and to stably seat the component on the mold 230.

Conventionally, a separate bracket is used to fix the electronic component 220 to the mold 230. The separate bracket is attached to the mold 230 via bonding or screwing at the rear face of the electronic component 220. This approach may require a large area in addition to a region of the electronic component 220 because a large bonding region or screw coupling region 2402 should be achieved for the coupling reliability between the separate bracket and mold 230.

In accordance with the present disclosure, the first region 240*a* is sufficiently adhesive to the display module 150*a* or mold 230. The second region 240*b* is formed integrally with the first region 240*a*. Thus, the present approach does not require a wide region for the coupling reliability between the mold 230 and the electronic component.

That is, even when the rib 242 is used to fix the mold to the electronic component at the minimum area without using the existing screw coupling scheme, the coupling reliability between the electronic component 220 and the mold 230 may increase.

Figure 14:
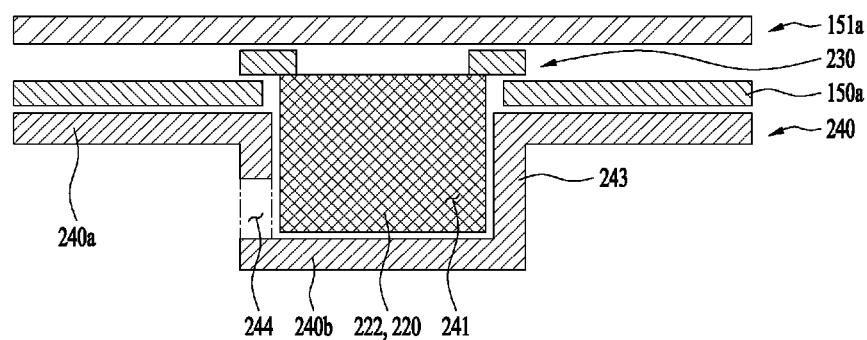
FIG. 14 shows a partial cross-section of a mobile terminal according to the present disclosure.

FIG. 14 shows a partial cross-section of a mobile terminal 100 according to the present disclosure.

Unlike the embodiment of FIG. 13, the seat 241 may not have the rib 242. When no rib 242 is formed, the output region 311 may be wider. However, since the coupling reliability between the metal frame 240 and the mold 230 at the electronic component 220 region is not high, it is necessary to sufficiently couple the metal frame 240 and the mold 230 to each other in another region.

The second region 240*b* of the metal frame 240 not only serves to define the seat 241 but also serves to define a structure for coupling to the mold 230.

Figure 15:
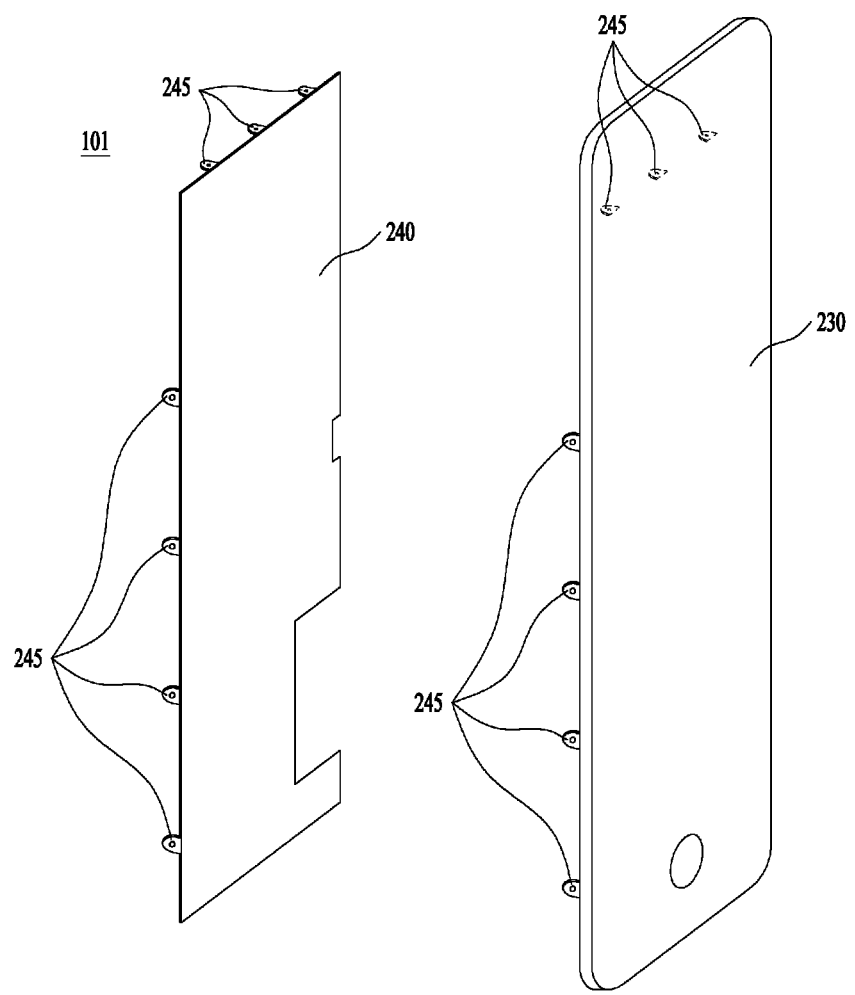
FIG. 15 shows a rear perspective view of a disassembled front casing according to the present disclosure.
Figure 16:
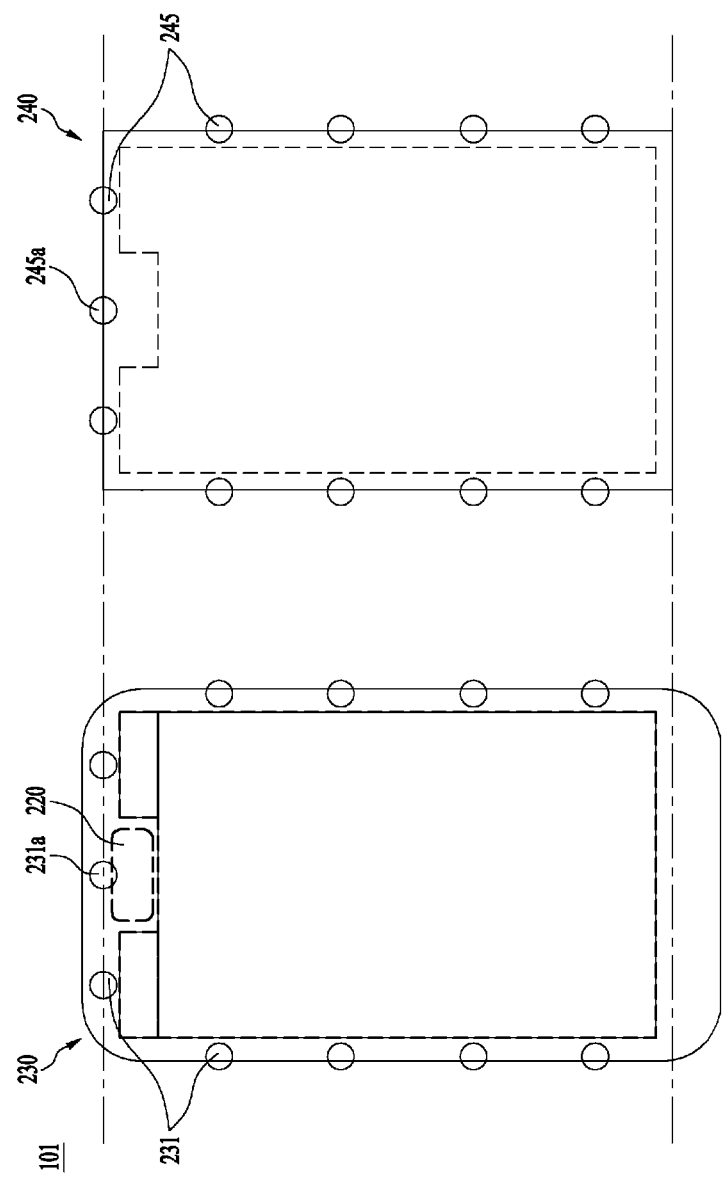
FIG. 16 shows a rear face view of a disassembled front casing according to the present disclosure.

FIG. 15 is a rear perspective view of an exploded front casing 101 according to the present disclosure. FIG. 16 is a rear view of an exploded front casing 101 according to the present disclosure.

Reference to FIG. 15 and FIG. 16 together will be made for convenience of description.

The metal frame 240 may be coupled to the mold 230 to fix the display module 150*a* thereto. The metal frame 240 may be coupled to the mold 230 in a bonding scheme or coupled to the mold 230 in a screw manner.

The metal frame 240 may have a plurality of first hole-defined protrusions 245 arranged along an outer edge thereof. The mold 230 may have a plurality of second hole-defined protrusion 231 arranged along an outer edge thereof and corresponding to the plurality of first hole-defined protrusions 245. While aligning the first hole-defined protrusions 245 and the second hole-defined protrusions 231 with each other, a plurality of screws may pass through the first hole-defined protrusions 245 and the second hole-defined protrusions 231 respectively. Thus, the metal frame 240 may be coupled to the mold 230 in a screw manner.

The second hole-defined protrusion 231 may be made of a metallic material. The second hole-defined protrusion 231 may be mold-coupled to the mold 230 made of the resin material in a double injection manner.

The first hole-defined protrusion 245 and the second hole-defined protrusion 231 may extend in a thickness direction of the mobile terminal 100. In accordance with the purpose of the present disclosure to maximize the output region and maximize a space for the electronic component 220, it is preferable to extend the hole-defined protrusions in the thickness direction rather than in the planar direction.

The second hole-defined protrusions 231 may be formed at the left and right corners of the mold 230 corresponding to the left and right corners of the metal frame 240. The second hole-defined protrusions 231 may be formed at the upper and lower corners of the mold 230 corresponding to the upper and lower corners of the metal frame 240.

The first hole-defined protrusions 245 and the second hole-defined protrusions 231 may be formed at one side edge adjacent to the electronic component 220. When the first hole-defined protrusions 245 and the second hole-defined protrusions 231 may be coupled to each other at one side edge adjacent to the electronic component 220, the bonding between the metal frame 240 and the mold 230 is stronger, so that the electronic component 220 may be supported with a greater supporting force.

When the metal frame 240 fully supports the electronic component 220, the electronic component 220 may be fixed thereto without the separate rib 242, as shown in the FIG. 14.

Figure 17:
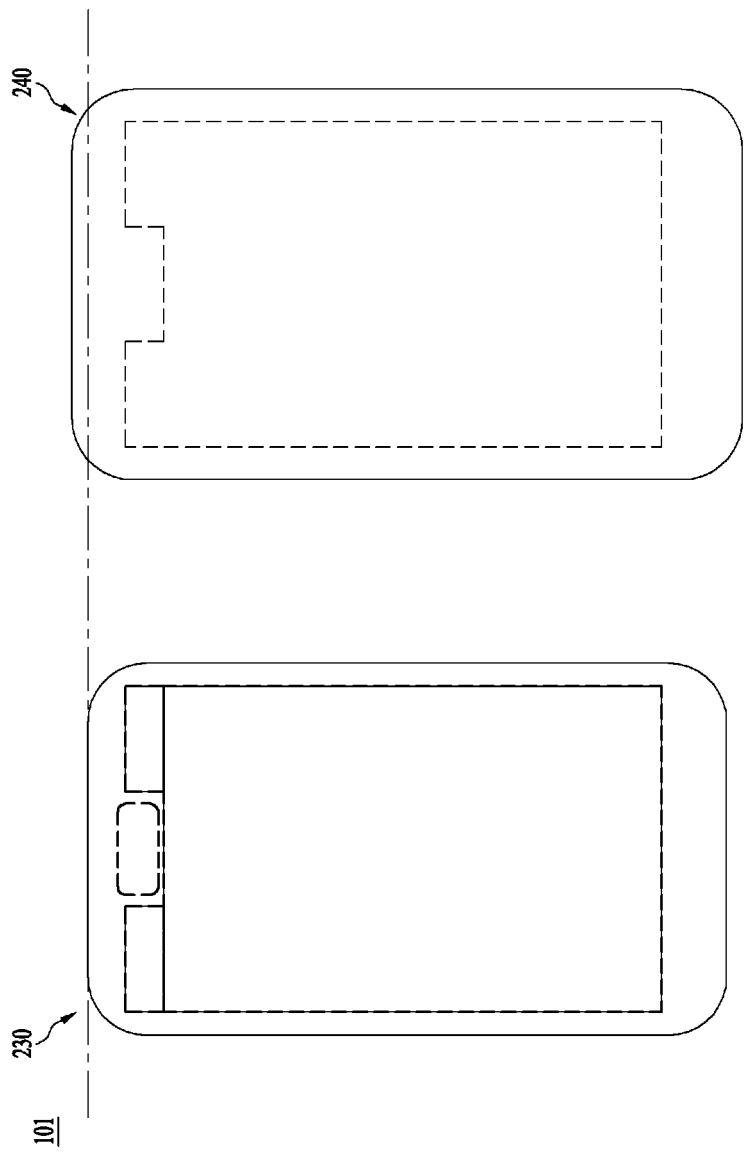
FIG. 17 shows a rear face view of a disassembled front casing according to the present disclosure.

FIG. 17 is a rear view of an exploded front casing 101 according to the present disclosure.

Alternatively, the metal frame 240 may at least partially cover an edge of the mold 230.

In the above-described embodiments, the metal frame 240 is positioned inwardly of the edge of the mold 230 and fixed to the mold 230.

Alternatively, at least one region of the metal frame 240 may be located outwardly of an edge of the mold 230 and is fixed thereto.

When the metal frame 240 protrudes outwardly from an edge of the mold 230, the combination of the window 151*a* and mold 230 may be seated on and secured to the metal frame 240.

In this case, it is preferable that the mold 230 and the metal frame 240 are fixed to each other via an adhesive tape 251.

The mold 230 may be replaced with a printed region unlike the above-described embodiments. That is, the printed region may play only a role of screening the non-output region 312 on a front face of the mobile terminal 100, while the metal frame 240 may play a role of a frame having rigidity.

Figure 18:
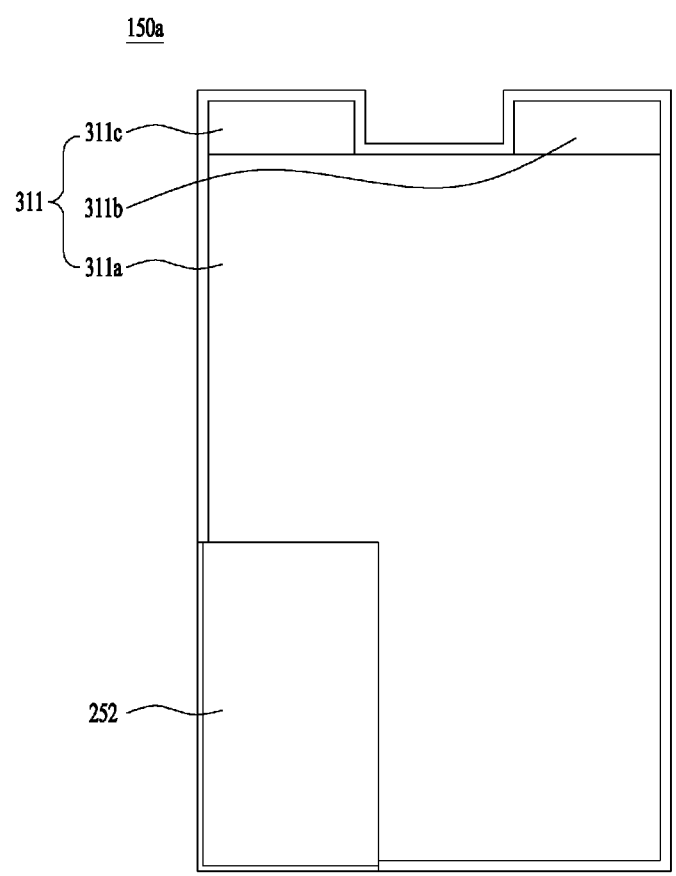
FIG. 18 shows a rear face view of a display module according to the present disclosure.

FIG. 18 shows a rear view of a display module 150*a* according to the present disclosure.

A driver 252 includes a chip for driving the output of the display module 150*a* and the cable.

The driver 252 may be separately disposed on the rear face of the display module 150*a*. Alternatively, the driver 252 may be disposed on a flexible printed board connected to the display module 150*a*. This scheme is referred to as Chip On Film (COF) scheme.

Unlike the output region configuration of the conventional display module 150*a*, a position of the driver 252 may should be considered due to the presence of the second output sub-region 311*b* and the third output sub-region 311*c*.

Since the electronic component 220 is provided in a region above the display module 150*a*, the driver 252 may be disposed in the region above the display module. Accordingly, the driver 252 may be connected to a left side, right side, or bottom of the display module 150*a* and thus be coupled to the main printed circuit board 210.

Figure 19:
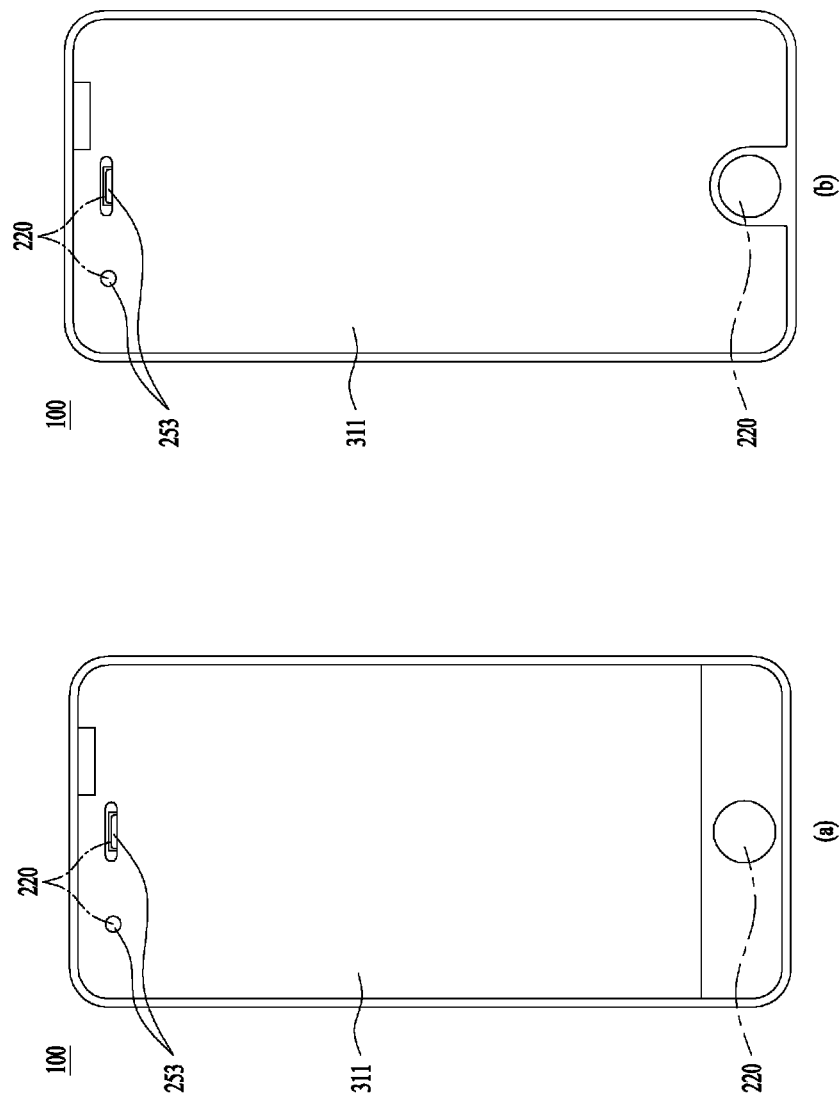
FIG. 19 shows another embodiment of a mobile terminal according to the present disclosure.

FIG. 19 shows another embodiment of a mobile terminal 100 according to the present disclosure.

The foregoing embodiments have the feature in which an output region 311 of the display module 150a has a recessed region such that the output region does not contain a region in which the electronic component 220 is disposed.

Hereinafter, an embodiment of the mobile terminal 100 having an opening 253 such that the output region 311 of the display module 150a contains the electronic component 220 will be described.

The display module 150a may have the opening 253 in a region corresponding to the electronic component 220. That is, the display module 150a has a non-output region 312 in at least one point in the output region 311.

The output region 311 may be maximized by using only a minimum region of the opening 253 as the non-output region 312 to perform a function of the electronic component 220 and using an entirety of a remaining region as the output region 311.

The output region 311 of the display module 150a contain the non-output region 312. Thus, a construction of the opening 253 to be formed in the display module 150a and a mounting structure of the electronic component 220 provided in a region corresponding to the opening 253 should be considered.

In particular, the electronic component 220 should be securely seated on the seat while a clearance is absent therebetween. When the electronic component 220 is directly disposed on the rear face of the display module 150a, it is difficult to protect the display module 150a.

Thus, a bottom edge of the output region 311 of the display module 150a may coincide with a straight edge above a region corresponding to the electronic component 220 as located at a bottom portion, as shown in FIG. 19(a). As shown in FIG. 19(b), the output region 311 of the display module 150a may exclude a region corresponding to the electronic component 220 as located at a bottom portion. The feature of the embodiment having the above-described output sub-regions as spaced from each other may be applied to the configuration of FIG. 19(b).

Figure 20:
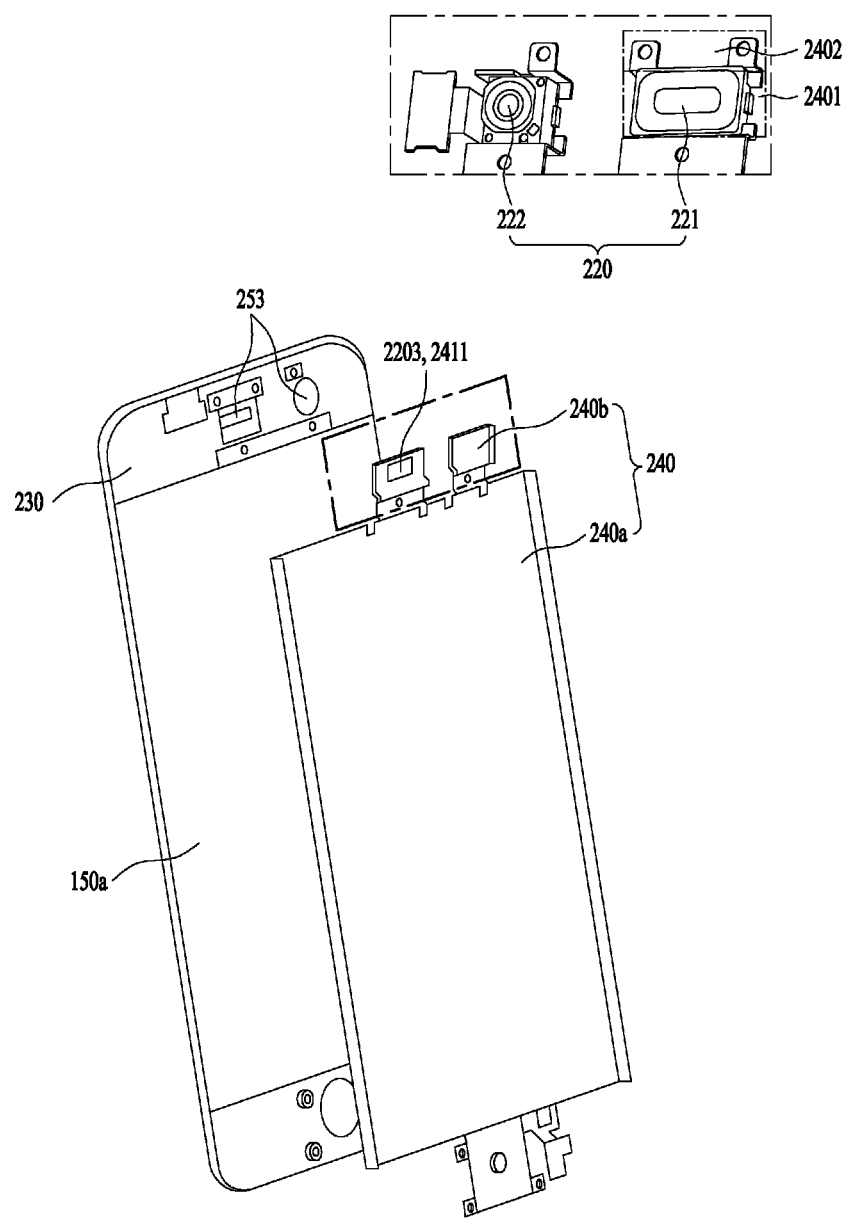
FIG. 20 is a rear perspective view of a partially exploded mobile terminal according to the present disclosure.

FIG. 20 shows a rear perspective view of a partially disassembled mobile terminal 100 according to the present disclosure.

The electronic component 220 may be disposed on the front-face of the metal frame 240 and fixed thereto. As in the previous embodiments, the metal frame 240 supports and protects the rear face of the display module 150a.

The seat 241 may be formed on the front face of the metal frame 240 to seat the electronic component 220 on the seat. The features of the seat 241 may be the same as those described in FIG. 13 and FIG. 14, unless otherwise noted.

As in the previous embodiments, the metal frame 240 includes the first region 240a corresponding to the rear face region of the display module 150a, and the second region 240b for fixing the electronic component 220 to the mold 230.

The second region 240b of the metal frame 240 is fixedly coupled to the mold 230. The combination of the metal frame 240 and the mold 230 may fix the electronic component 220 therebetween thereto.

The second region 240b of the metal frame 240 defining the seat 241 may be integrally formed with the first region 240a of the metal frame 240 as described above. The result is as described above.

The electronic components 220 may be arranged on a module basis and may be fixed to the seat 241. The electronic component 220 may be fixed directly to the metal frame or mold 230 or indirectly fixed thereto via fixing between the mold 230 and the metal frame 240.

The mold 230 may act as a counterpart to which the metal frame 240 may be coupled. The fixed combination between the mold 230 and the metal frame 240 may be implemented via the adhesive tape 251 as described above or be implemented via screwing.

In this embodiment, a case where the screw coupling is employed is described. When the mold 230 and the metal frame 240 are fixed to each other via screw coupling, the electronic component 220 may be reliably fixed thereto. However, the screw coupling scheme may be replaced with the adhesive scheme within a scope of this feature.

Figure 21:
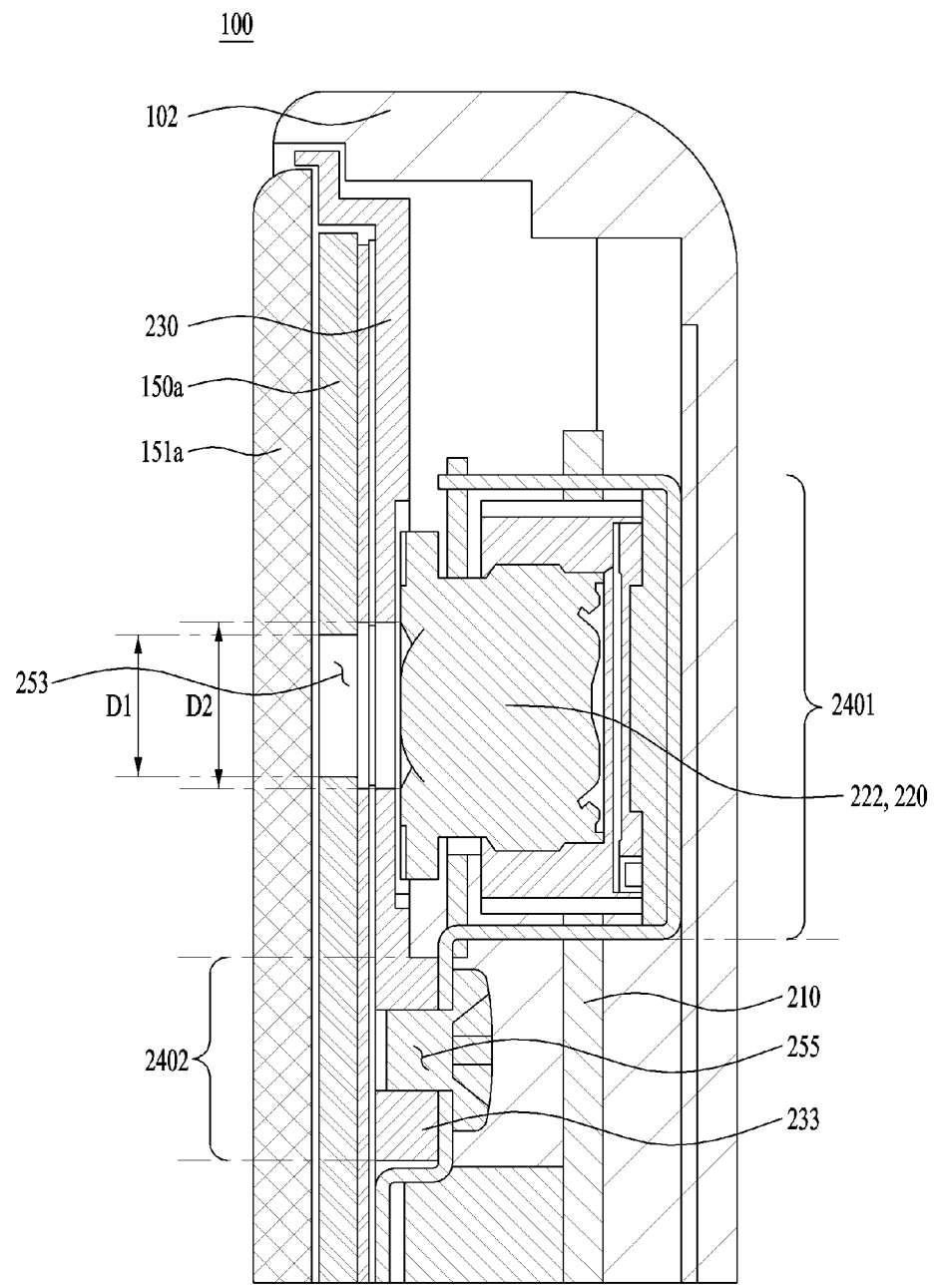
FIG. 21 shows a partial cross-section of a mobile terminal according to the present disclosure.

FIG. 21 shows a partial cross-section of a mobile terminal 100 according to the present disclosure.

We will refer to FIG. 20 and FIG. 21 together for convenience of description.

In the metal frame 240, the region actually occupied by the electronic component 220 is called a seated region 2401. Further, the region formed in the metal frame 240 for fixing the electronic component 220 is called a fixing region 2402.

For convenience of description, the region where the electronic component 220 is mounted is defined as a seated region while the region of the metal frame 240 for fixing the electronic component 220 is defined as a fixing region 2402.

The mold 230 may include not only a region corresponding to the fixing region 2402 but also at least a portion of the seated region.

That is, when the mold 230 does not cover a portion of the rear face of the display module 150a corresponding to the seated region of the electronic component 220, it is difficult to protect the portion of the rear face of the display module 150a corresponding to the seated region. The mold 230 protects the portion of the rear face of the display module 150a.

The mold 230 may have an opening 253 for exposure of an front face of of the electronic component 220.

Therefore, the front-face of the electronic component 220 may be exposed to the outside through the opening 253 of the display module 150a and the opening 253 of the mold 230.

As described above, the first region 240a and the second region 240b of the metal frame 240 may be integrally formed with each other. The effect therefrom is as described above.

A diameter D2 of the opening 253 of the mold 230 may be larger than a diameter D1 of the opening 253 of the display module 150a. This is to ensure that a front face of the mold 230 is not visible to the outside and that the electronic component 220 is exposed as much as possible through the opening 253 of the minimum diameter.

When the mold 230 and metal frame 240 are screw-coupled to each other, the mold 230 and metal frame 240 may have screw holes 255 defined therein respectively.

To provide a sufficient counterpart for the screw engagement, the mold 230 may have a protrusion 233 thicker than the other regions in a region corresponding to the screw hole 255.

Figure 22:
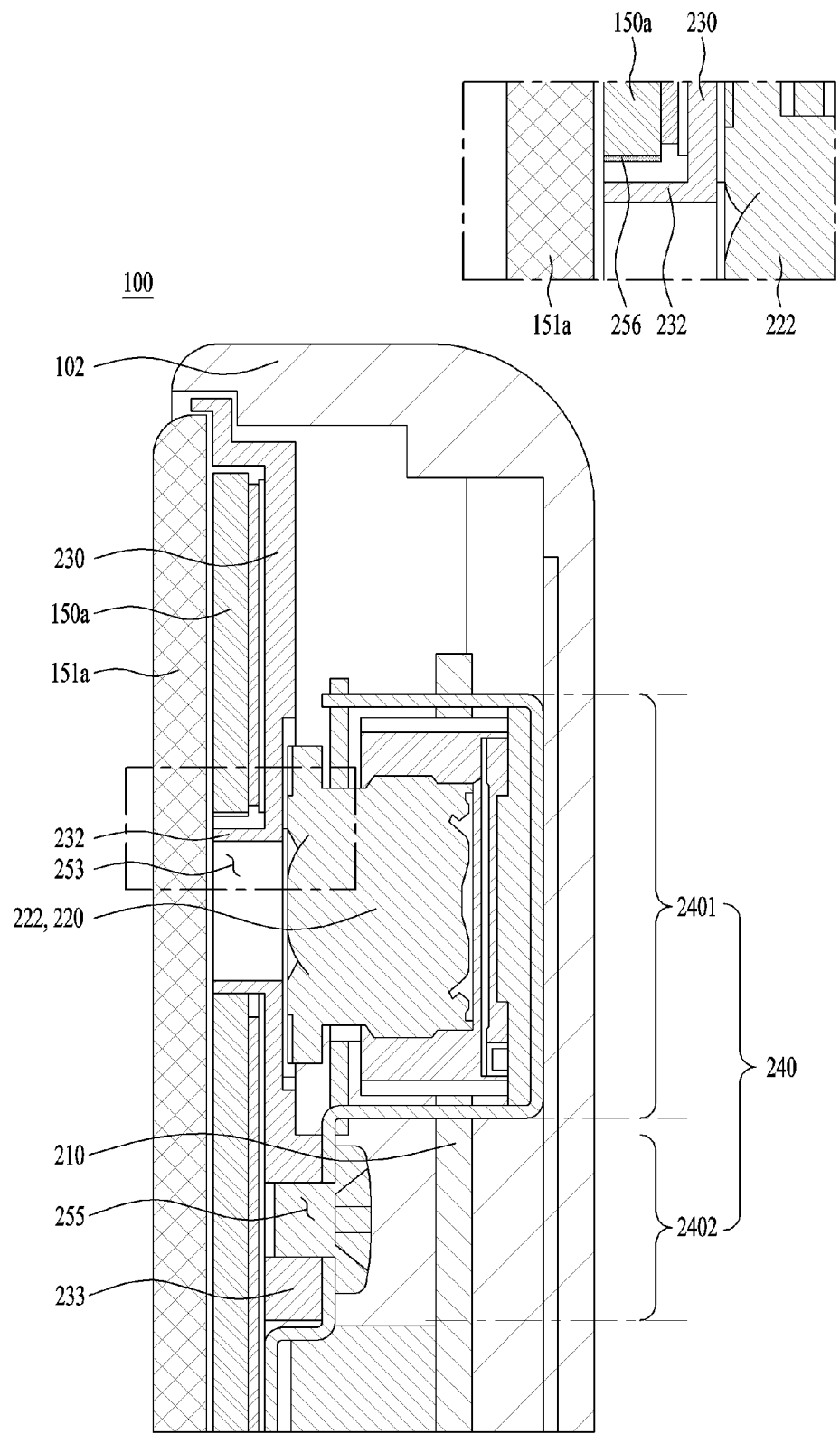
FIG. 22 shows a partial cross-section of a mobile terminal according to the present disclosure.

FIG. 22 shows a partial cross-section of a mobile terminal 100 according to the present disclosure.

Unlike the embodiment of FIG. 21, mold 230 may include a guide bracket 232 covering a side face of the opening 253 of the display module 150a.

The guide bracket 232 may protrude toward the front face of the mobile terminal 100 along an edge of the opening 253 of the mold 230.

The guide bracket 232 may serve as a centering guide to guide correct positions of the display module 150a and the mold 230 when the display module 150a and the mold 230 are combined with each other.

When the guide bracket 232 surrounds the side face of the opening 253 of the display module 150a, an adhesive material 256 for fixing a color filter layer and a thin film transistor layer of the display module 150a to each other as horizontally extends conventionally may extend in the vertical direction, that is, in the thickness direction of the mobile terminal 100. In this connection, the color filter layer and the guide bracket 232 are bonded to each other and then the TFT layer and the guide bracket 232 are bonded to each other. Thus, the color filter layer and thin film transistor layer of the display module 150a may be fixed to each other.

Thus, the display output region 311 can be maximized when the color filter layer and the TFT layer are not bonded to each other in the horizontal direction.

Figure 23:
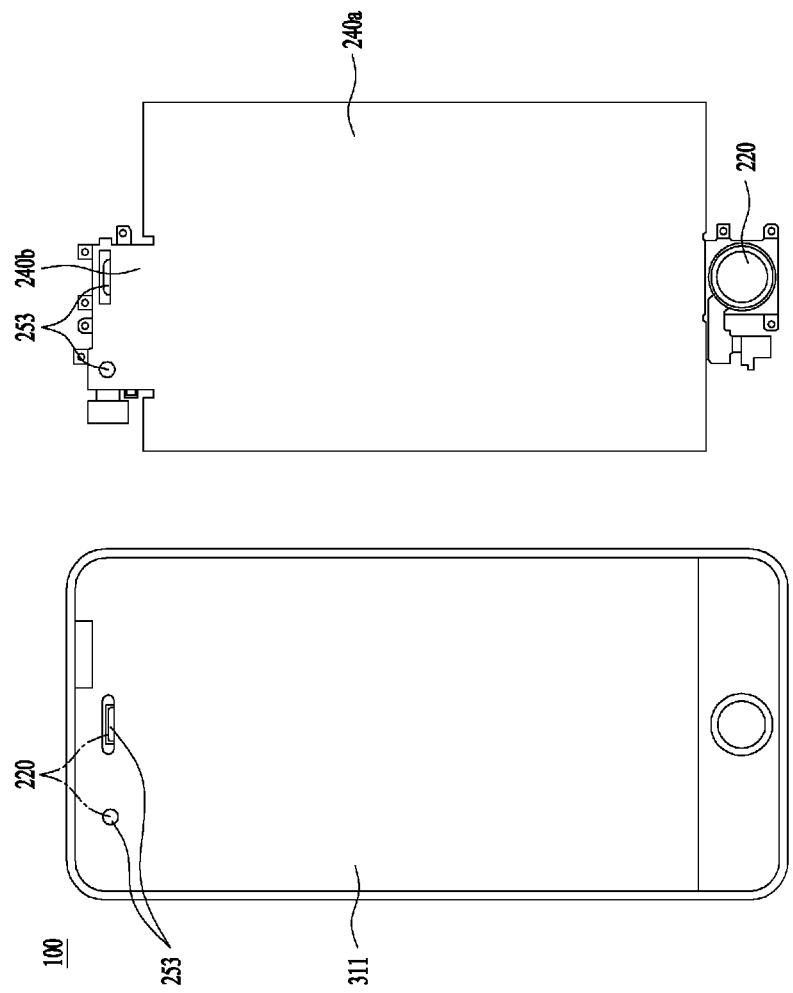
FIG. 23 is a front view of a partially disassembled mobile terminal according to the present disclosure.
Figure 24:
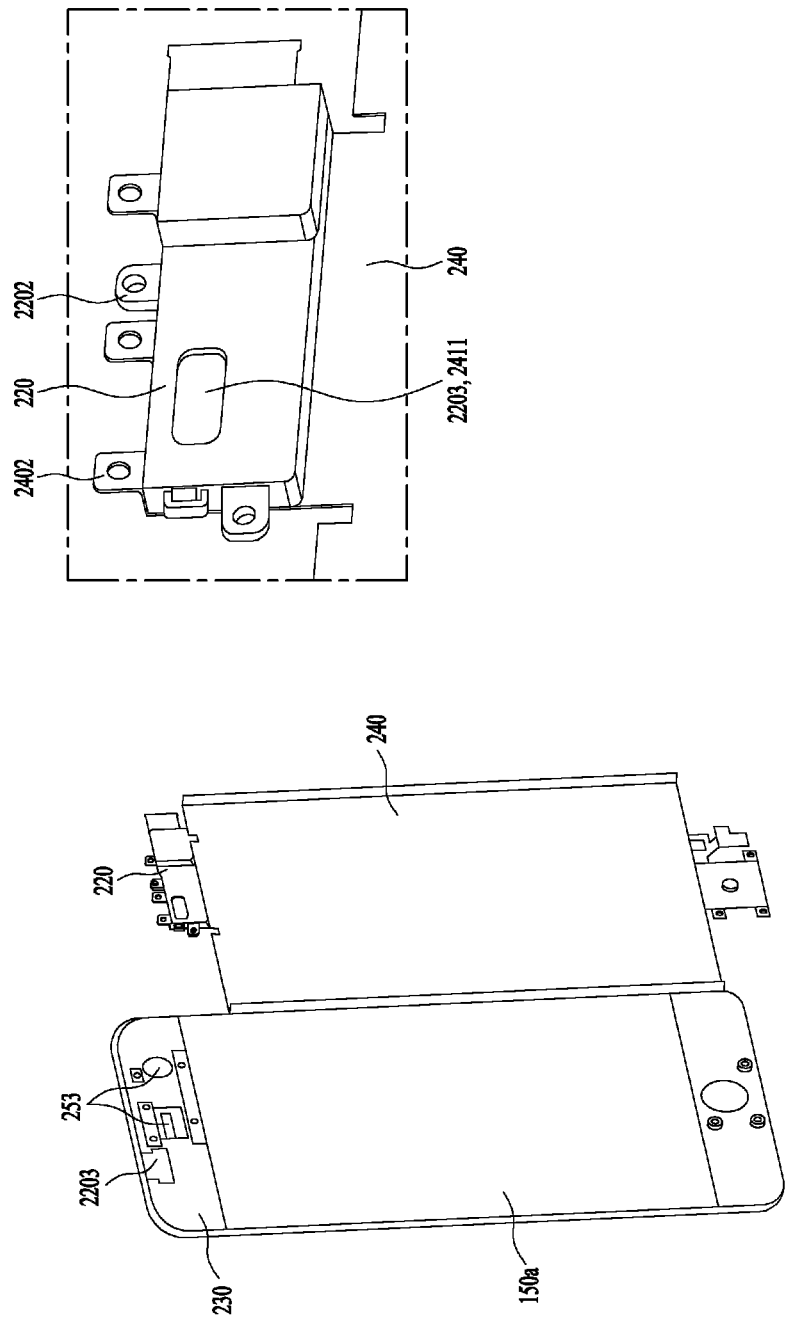
FIG. 24 is a perspective view of a partially disassembled mobile terminal according to the present disclosure.
Figure 25:
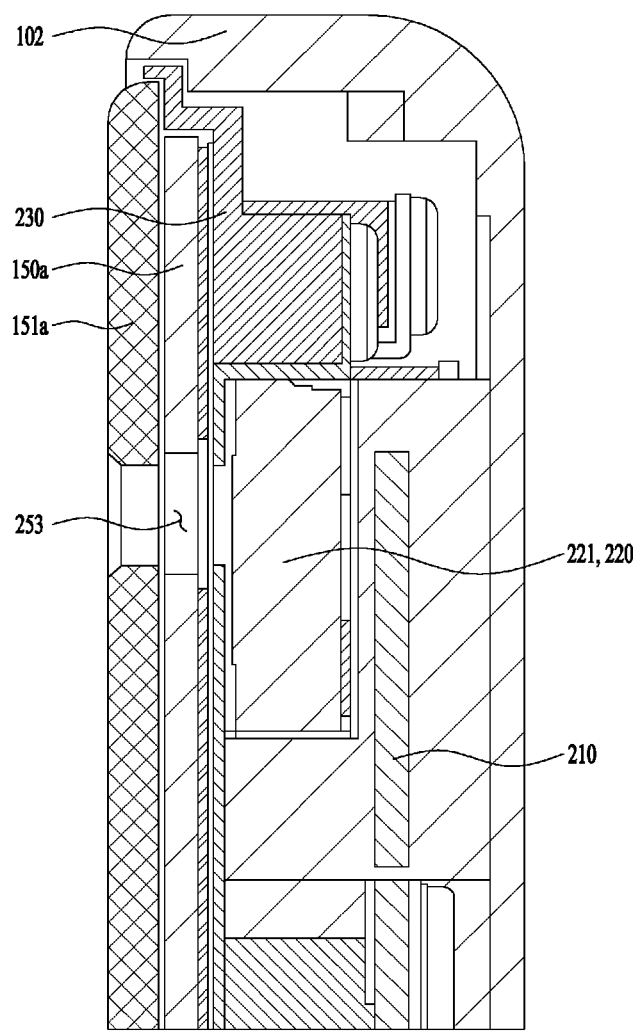
FIG. 25 is a cross-section view of a portion of a mobile terminal viewing a region containing electronic components.

FIG. 23 is a partial exploded front view of a mobile terminal 100 according to the present disclosure. FIG. 24 shows a rear perspective view of a partially disassembled mobile terminal 100 according to the present disclosure. FIG. 25 is a cross-section view of a portion of a mobile terminal viewing a region containing electronic components.

We will refer to FIG. 23 to FIG. 25 together for convenience of description.

Unlike the embodiment of FIGS. 20 to 22, the electronic component 220 may be coupled to the rear face of the metal frame 240. In this connection, the metal frame 240 may have an opening 253 for exposure of the front face of the electronic component 220.

The mold 230 may only have the screw fixing region 2402 unlike the embodiment of FIGS. 20 to 22. Since the metal frame 240 already exists in the seated region for the electronic component 220, there is no need for a separate rigid member. Thus, the mold 230 may define an opening in the region, thereby minimizing the overall thickness of the mobile terminal 100.

Even in this case, the electronic components 220 may be arranged on a module basis and may be fixed or coupled thereto.

In the embodiment of FIGS. 20 to 22, the electronic component 220 is fixed to and between the metal frame 240 and the mold 230. Thus, there may be no need for a separate fixing structure. In this embodiment, a separate fixing structure is required in that the electronic component 220 is disposed on the rear face of the metal frame 240.

For example, the electronic component 220 may include a hook 2201 and may be coupled to the rear face of the metal frame 240 via a hook coupling structure. Alternatively, the electronic component 220 may be coupled to the metal frame 240 or the mold 230 via screw coupling. If the metal frame 240 is screw-coupled to the mold 230, the electronic component 220 and the metal frame 240 may be screw-coupled to each other using the same hole-defined protrusions 2202. Alternatively, the electronic component 220 may be coupled to the mold 230 using individual hole-defined protrusions 2202.

For the coupling reliability, both the hook coupling structure and the screw coupling structure may be applied at the same time.

The embodiment of FIG. 13 and FIG. 14 discloses that the cable hole 244 is formed in the side wall 243 of the seat 241. In the embodiment of FIG. 19 to FIG. 25, a terminal hole 2411 is formed in the rear face of the seat 241. A terminal 2203 of the electronic component 220 is exposed to the outside through the terminal hole 2411. The exposed terminal 2203 may be electrically connected to a terminal provided on the printed circuit board 210. In order to ensure contact reliability, one of the both terminals contacting each other may be embodied in a form of a clip.

MODE FOR CARRYING OUT DISCLOSURE

Various aspects for carrying out the invention have been described in the above Detailed Description section.

The description should not be construed as limiting in all respects, but should be considered as illustrative. The scope of the present disclosure shall be determined by reasonable interpretation of the appended claims. All changes that are within an equivalent scope under the present disclosure are included in the scope under the present disclosure.

INDUSTRIAL APPLICABILITY

As mentioned above, the present disclosure may be at least partially applied to all types of mobile terminals.

What is claimed is:

1. A mobile terminal including;
   a window;
   a display module disposed on a rear face of the window and having a first opening;
   a support plate disposed on a rear face of the display module and having a second opening; and
   an electronic component disposed on a rear face of the support plate,
   wherein a front part of the electronic component is disposed in the first opening and the second opening,
   wherein a diameter of the fist opening is smaller than a diameter of the second opening to prevent the support plate from being exposed through the first opening, and
   wherein the first opening is located within an output region of the display module.

2. The mobile terminal of claim 1, wherein the first opening forms a non-output region corresponding to a size of the first opening within the output area of the display module.

3. The mobile terminal of claim 1, wherein the electronic component includes at least one of a receiver, a camera, a luminance sensor, and a proximity sensor.

4. The mobile terminal of claim 1, wherein the support plate includes a mold made of a non-conductive material and a metal frame made of a conductive material.

5. The mobile terminal of claim 4, wherein the mold and window are fixed to each other via an adhesive material.

6. The mobile terminal of claim 4, wherein the mold forms a region that does not interfere with a radio frequency based performance of an antenna of the mobile terminal.

7. The mobile terminal of claim 4, wherein the mold includes a seated region corresponding to the electronic component.

8. The mobile terminal of claim 7, wherein the second opening is disposed corresponding to the seated region of the mold.

9. The mobile terminal of claim 1, wherein the window includes an entire front-face region in a flat shape and an edge region in a curved shape toward a rear face of the mobile terminal.

10. The mobile terminal of claim 1, wherein the window includes an entire front-face region in a flat shape and an edge region in a curved shape toward a rear face of the mobile terminal.

11. A mobile terminal comprising:
a window;
a display module disposed on a rear face of the window and having a first opening;
a support plate disposed on a rear face of the display module and having a second opening; and
an electronic component disposed on a rear face of the support plate, wherein a front part of the electronic component is disposed in the first opening and the second opening, wherein the support plate includes a mold made of a non-conductive material and a metal frame made of a conductive material, wherein the mold includes a seated region corresponding to the electronic component, wherein the second opening is disposed corresponding to the seated region of the mold, wherein a diameter of the first opening is smaller than a diameter of the second opening, wherein the first opening is located within an output region of the display module, and wherein the first opening forms a non-output region corresponding to a size of the first opening within the output area of the display module.

12. The mobile terminal of claim 11, wherein the electronic component includes at least one of a receiver, a camera, a luminance sensor, and a proximity sensor.

13. The mobile terminal of claim 11, wherein the mold and the window are fixed to each other via an adhesive material.

14. The mobile terminal of claim 11, wherein the mold forms a region that does not interfere with a radio frequency based performance of an antenna of the mobile terminal.

15. A mobile terminal comprising:
a window including an entire front-face region in a flat shape and an edge region in a curved shape toward a rear face of the mobile terminal;
a display module disposed on a rear face of the window and having a first opening;
a support plate disposed on a rear face of the display module and having a second opening; and
an electronic component disposed on a rear face of the support plate,
wherein a front part of the electronic component is disposed in the first opening and the second opening,
wherein the support plate includes a mold made of a non-conductive material and a metal frame made of a conductive material,
wherein the mold includes a seated region corresponding to the electronic component,
wherein the second opening is disposed corresponding to the seated region of the mold,
wherein a diameter of the first opening is smaller than a diameter of the second opening,
wherein the first opening is located within an output region of the display module, and
wherein the first opening forms a non-output region corresponding to a size of the first opening within the output area of the display module.

* * * * *